(12) United States Patent
Duval

(10) Patent No.: US 7,682,100 B2
(45) Date of Patent: Mar. 23, 2010

(54) SELF-TIGHTENING FASTENING SYSTEM

(75) Inventor: John Andrew Duval, Long Beach, CA (US)

(73) Assignee: Nectar, Inc., Long Beach, CA (US)

( * ) Notice: Subject to any disclaimer, the term of this patent is extended or adjusted under 35 U.S.C. 154(b) by 0 days.

(21) Appl. No.: 11/577,702

(22) PCT Filed: Oct. 24, 2005

(86) PCT No.: PCT/US2005/038155

§ 371 (c)(1),
(2), (4) Date: Apr. 20, 2007

(87) PCT Pub. No.: WO2006/047402

PCT Pub. Date: May 4, 2006

(65) Prior Publication Data

US 2007/0292205 A1   Dec. 20, 2007

Related U.S. Application Data

(60) Provisional application No. 60/621,563, filed on Oct. 22, 2004, provisional application No. 60/706,322, filed on Aug. 8, 2005.

(51) Int. Cl.
*F16B 21/02* (2006.01)
(52) U.S. Cl. .............. 403/328; 403/325; 403/330; 403/DIG. 12; 312/111; 312/265.5
(58) Field of Classification Search ........... 403/238, 403/263, 322.1, 325, 326, 327, 328, 330, 403/DIG. 12; 312/108, 111, 263, 265.5; 292/210, 242, 304, DIG. 20, DIG. 47, DIG. 61
See application file for complete search history.

(56) References Cited

U.S. PATENT DOCUMENTS

| 3,893,211 | A |   | 7/1975 | Skinner |
| 4,088,355 | A |   | 5/1978 | Dey |
| 4,523,871 | A |   | 6/1985 | Recker |
| 4,553,873 | A | * | 11/1985 | Salice .................. 403/330 |
| 4,582,446 | A |   | 4/1986 | Salice |
| 4,697,946 | A | * | 10/1987 | Rock et al. ............ 403/327 |
| 4,990,020 | A | * | 2/1991 | Matsui ............ 403/DIG. 12 |
| 5,522,669 | A |   | 6/1996 | Recker |
| 5,577,859 | A |   | 11/1996 | Nau |
| 5,785,451 | A | * | 7/1998 | Horger et al. ........ 403/DIG. 12 |

(Continued)

*Primary Examiner*—Michael P Ferguson
(74) *Attorney, Agent, or Firm*—The Eclipse Group LLP

(57) ABSTRACT

A self-tightening device for fastening two structures together includes a female component and a male component where the female component is capable of receiving the male component. The female component includes a moveable member, an energy storing mechanism and a retaining mechanism. The movable member is movable between an unlocked position and a locked position. The energy storing mechanism has stored energy for causing the moveable member to move from the unlocked to locked position when the energy in the energy-storing mechanism is released. The retaining mechanism holds the energy-storing mechanism in the stored-energy state until the retaining mechanism is released. Upon the release of the retaining mechanism, the energy storing mechanism is actuated from the stored-energy state to the released-energy state causing the movable member to move from the unlocked position to the locked position engaging the male component with the female component when the male component is inserted within the female component.

8 Claims, 40 Drawing Sheets

U.S. PATENT DOCUMENTS

| | | |
|---|---|---|
| 5,820,291 A | 10/1998 | Lutz |
| 5,970,588 A | 10/1999 | Hurtz et al. |
| 6,257,813 B1 | 7/2001 | Tanimura |
| 6,461,091 B2 | 10/2002 | Herb et al. |
| 6,557,955 B2 | 5/2003 | Saravis ....................... 312/111 |
| 6,669,036 B1 | 12/2003 | Yang et al. ................ 211/181.1 |

* cited by examiner

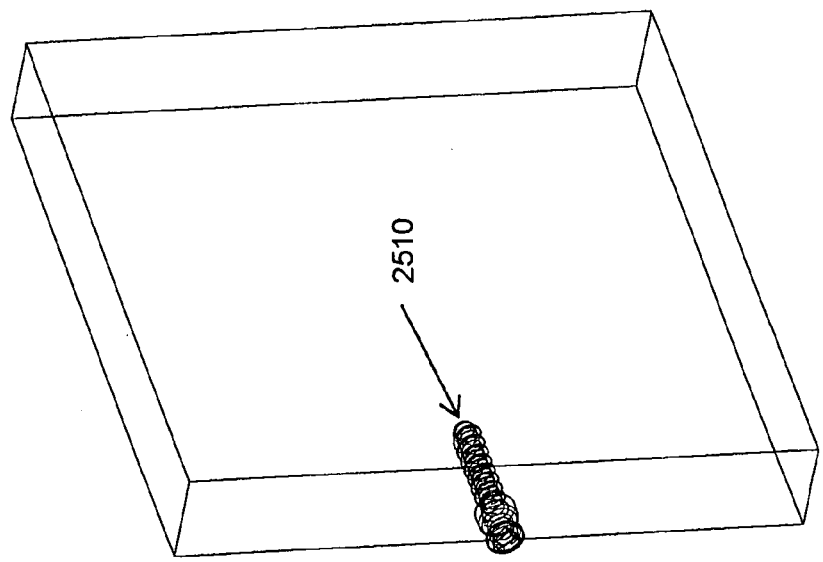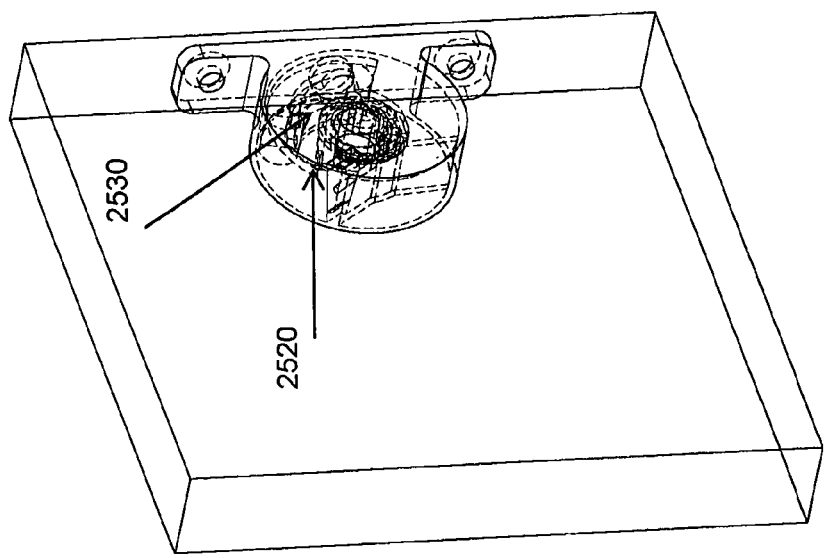
FIG. 29

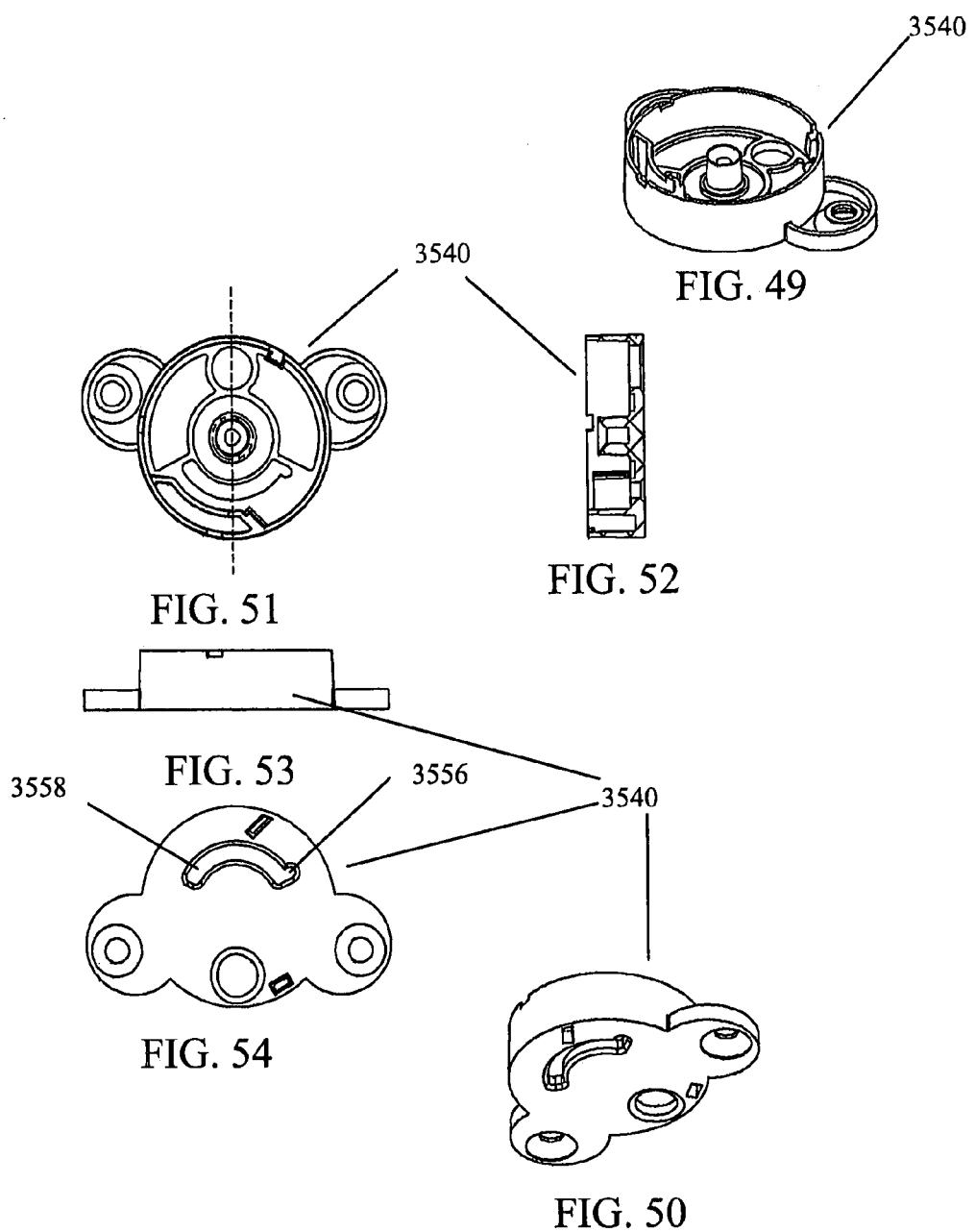

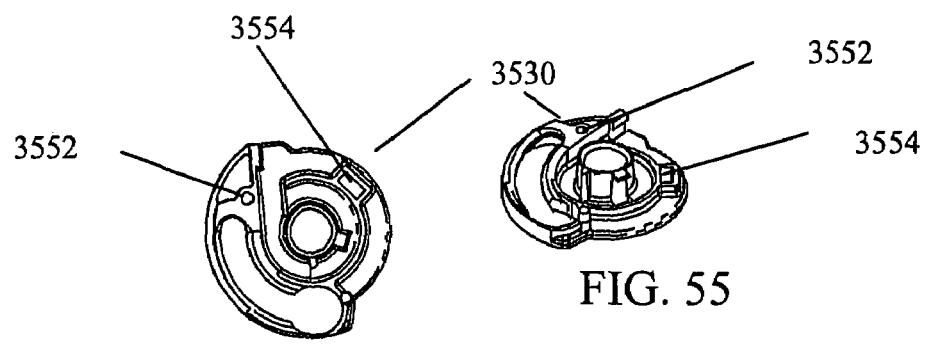
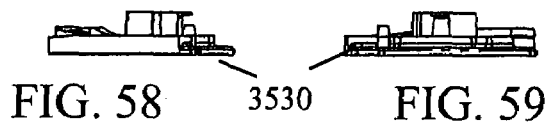
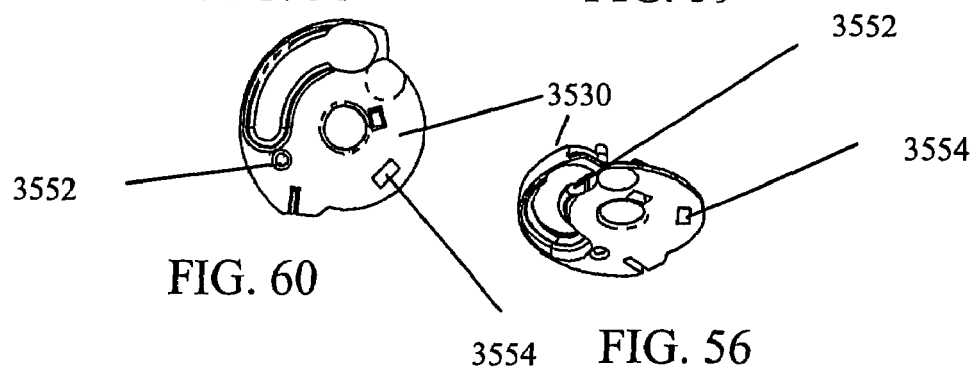

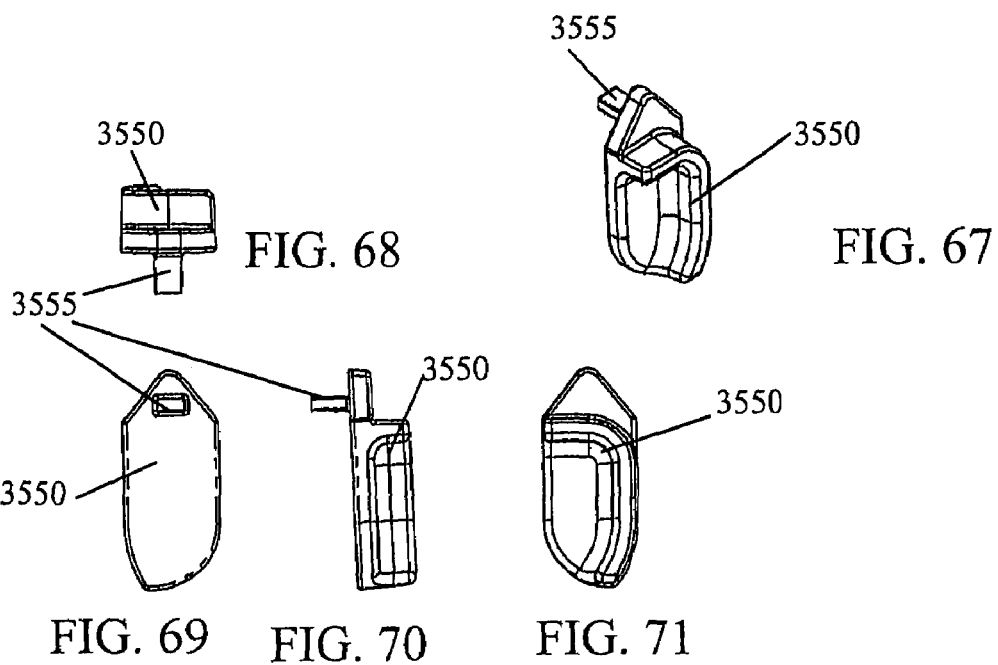
FIG. 68  FIG. 67
FIG. 69  FIG. 70  FIG. 71
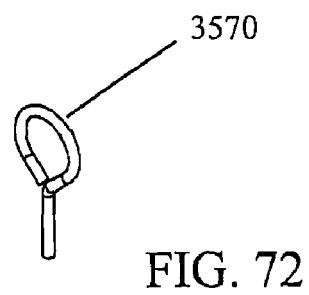
FIG. 72

SELF-TIGHTENING FASTENING SYSTEM

RELATED APPLICATIONS

This application claims priority to U.S. Provisional Patent Application Ser. No. 60/621,563 filed on Oct. 22, 2004, titled "Flat Packable, Self Tightening Fastener" and U.S. Provisional Patent Application Ser. No. 60/706,322 filed on Aug. 8, 2005, titled "Self-Tightening Fastening System", both applications of which are incorporated into this application by reference in their entireties.

BACKGROUND OF THE INVENTION

1. Field of the Invention

This invention relates generally to a fastening system that may be used to fasten two structures or objects together. More particularly, the invention relates to a fastening device in which a male part may be inserted into a female part such that the male and female parts may be securely locked together.

2. Related Art

Many types of manufactured products often consist of two or more parts or components that must be assembled together to attain finished, usable products. To save cost in assembly, handling, shipping and storage, manufacturers often make such products available to end users in an initially disassembled form. For instance, manufacturers often provide a product that is packaged in a "flat pack," which typically consists of a cardboard box containing the various parts of the product in disassembled form and a bag of fastening hardware required for assembling the parts together. In particular, manufacturers often ship furniture such as bookshelves, cabinets, and the like in flat packs containing the wood panels, other parts, and bag of hardware necessary for the end user to assemble the complete piece of furniture.

While the provision of disassembled products is beneficial to manufacturers or sellers, it is nonetheless attended by well-known disadvantages for purchasers and end users. The process of assembly can be difficult, complex, and time-consuming for the average consumer. Often, the process requires the use of tools and in some cases special tools that are packaged with the fastening hardware, all or a portion of which may sometimes be missing from the flat pack. Additionally, the fastening components themselves typically are required to be fastened to their corresponding parts prior to being secured together during assembly, because the fastening components are not pre-installed by the manufacturer to the parts to be assembled. This is often because pre-installed fastening components by convention would protrude from the parts, thereby increasing the space required for the package or container (e.g., preventing wood panels from being closely stacked together) and increasing the risk that parts become damaged during shipment and handling.

Therefore, a need exists for providing improved fastening solutions that enhance the ability of end users to assemble the parts of a product together. Generally, any objects for which assembly is desired through the employment of fastening hardware may benefit from improved fastening solutions.

SUMMARY

A self-tightening device is provided for fastening two structures together that includes a female component and a male component where the female component is capable of receiving the male component. The female component includes a moveable member, an energy storing mechanism and a retaining mechanism. The movable member is movable between an unlocked position and a locked position. The energy storing mechanism has stored energy for causing the moveable member to move from the unlocked to locked position when the energy in the energy-storing mechanism is released. The retaining mechanism holds the energy-storing mechanism in the stored-energy state until the retaining mechanism is released. Upon the release of the retaining mechanism, the energy storing mechanism is actuated from the stored-energy state to the released-energy state causing the movable member to move from the unlocked position to the locked position engaging the male component with the female component when the male component is inserted within the female component.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood by referring to the following figures. The components in the figures are not necessarily to scale, emphasis instead being placed upon illustrating the principles of the invention. In the figures, like reference numerals designate corresponding parts throughout the different views.

FIG. 29 illustrates a plan view of the fastening device in FIG. 25 integrated into two structures.

FIG. 49 illustrates a top perspective view of housing of the female component of the fastening device in FIG. 35

FIG. 50 illustrates a bottom perspective view of the housing in FIG. 49.

FIG. 51 illustrates a top plan view of the housing in FIG. 49.

FIG. 52 illustrates a side view of the housing in FIG. 49.

FIG. 53 illustrates a front view of the housing in FIG. 49.

FIG. 54 illustrates an opposing plan view of the housing in FIG. 51.

FIG. 55 illustrates a top perspective view of the locking mechanism 3530 of the female component of the fastening device of FIG. 35.

FIG. 56 illustrates a bottom perspective view of the locking mechanism in FIG. 55.

FIG. 57 illustrates a top plan view of the locking mechanism in FIG. 55.

FIG. 58 illustrates a side view of the locking mechanism in FIG. 55.

FIG. 59 illustrates a front view of the locking mechanism in FIG. 55.

FIG. 60 illustrates an opposing plan view of the locking mechanism in FIG. 57.

FIG. 67 illustrates a perspective view of an example of a locking key having a release pin.

FIG. 68 illustrates a front view of the locking key in FIG. 67.

FIG. 69 illustrates a bottom view of the locking key in FIG. 67.

FIG. 70 illustrates a side view of the locking key in FIG. 67.

FIG. 71 illustrates a top view of the locking key in FIG. 67.

FIG. 72 illustrates a perspective view of a lock-out pin 3570.

DETAILED DESCRIPTION

Figure 1:
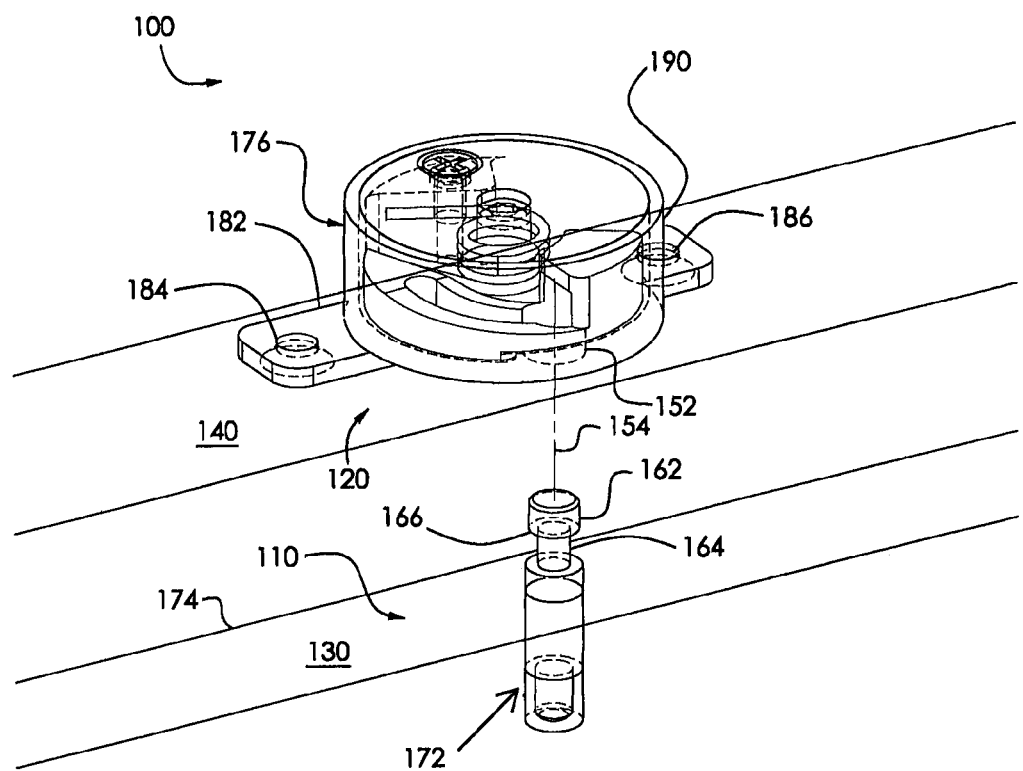
FIG. 1 is a perspective view of a fastening device according to one example of an implementation.

As illustrated in FIGS. 1-72, a self-tightening system is provided for fastening two structures together. The system includes a male component, and a female component designed to receive the male component. The female component further includes a movable member, or locking mechanism, that moves between an unlocked and locked position. When the male component is positioned within the female component, the movement of the moveable member between the unlocked and locked position secures the male component to the female component.

The self-tightening system further includes an energy storing mechanism that is retained in a stored-energy state by a releasable retaining mechanism. By releasing the retaining mechanism, the energy in the energy storing mechanism is also released. The release of the energy in the energy storing mechanism moves the moveable member from its unlocked to locked position and engages the male component when it moves from the unlocked to locked position to securely fastening the male component within the female component.

The retaining mechanism may be released upon the insertion of the male component into the female component. In one example, to release the energy in the energy storing mechanism, the male component, upon its insertion into the female component, may displace part(s) in the female component such that the opposing force placed on the energy storing mechanism is removed, thereby causing the movement of the moveable member. Alternatively, the energy in the energy storing mechanism may be released through an act separate from the insertion of the male component in the female component. In this manner, the release of the energy in the energy storing mechanism may occur independent of the insertion of the male component into the female component by, for example, a separate triggering mechanism. In this manner, the locking of male and female components that are not intended to mate may be avoided.

Accordingly, the moveable member may be held in place by a retaining or securing mechanism that is integrated into or included as an additional element of the female component and that acts alone, or in combination with other parts, to prevent the release of the energy in the energy storing mechanism. The moveable member may be moved from an unlocked to a locked position by an energy storing mechanism capable of causing mechanical displacement, including, but not limited to, a biasing element, spring deflection, compression gas, elastomer deflection, chemical energy, magnetic energy or other device, reaction or mechanism capable of storing and releasing energy. Through this mechanical displacement, the moveable member may be moved upon the release of the energy in the energy storing mechanism by the energy storing mechanism, directly or indirectly, releasing and/or applying force upon the moveable member to move the moveable member into the locked position. The moveable member may engage by moving in either a linear or circular direction or other direction to cause the male component to be secured against the female component.

When the moveable member is moved from an unlocked to locked position, the moveable member is designed to engage the male component to prevent the removal of the male component from the female component. This engagement of the male component by the female component may be accomplished by positioning structural elements of the moveable member or other element of the female component against or around the male component in a manner that prevents the removal of the male component from the female component. Further, the male component may be engaged by the moveable member or other element of the female component such that it causes the male component to be drawn further into the female component.

The female components may further be designed to only receive and secure certain sized male components to prevent the engagement of the moveable member through the insertion of a male component into a female component that is not intended to correspond with that particular female component. Examples of implementations of such fastening system are described below.

FIG. 1 is a perspective view of one example of a self-tightening fastening device 100 according to the invention. As illustrated in FIG. 1, the fastening device 100 includes a male component 110 and a female component 120. In some implementations, the male component 110 may be attached to or integrated with a first structure 130 and the female component 120 may be attached to or integrated with a second structure 140. No limitation is placed on the nature of the first structure 130 or the second structure 140 in terms of the types of structures or their respective compositions. Generally, the first structure 130 and the second structure 140 may be any objects that are to be assembled, secured, or fastened together. As one example, the first structure 130 and the second structure 140 may be pieces of furniture intended to be assembled together.

In the example illustrated in FIG. 1, the male component 110 may be inserted into the female component 120. In particular, the female component 120 may have a first male component inlet aperture 152. The male component 110 may be inserted through the first inlet aperture 152 along an axis, direction, or path of insertion 154. The fastening device 100 is configured such that, when the male component 110 is inserted into the female component 120, energy stored by the female component 120 is released in manner causing the female component 120, or portions of the female component 120, to move from an initially unlocked state to a locked state. As a result, the male component 110 may be locked within the female component 120. As a further result, any first structure 130 having a male component 110 may be securely fastened together with a second structure 140 having a female component 120. In some implementations, at least some of the energy released by female component 120 may cause male component 110 to be drawn farther into female component 120, as described below.

The male component 110 may include a head portion 162 and a reduced-diameter or neck portion 164 adjacent to head portion 162. Hence, an interfacial area is defined where head portion 162 is adjoined to neck portion 164, and may be characterized as a shoulder or edge 166. The male component 110 may be attached to or integrated with a first structure 130 by any suitable means. In the example illustrated in FIG. 1, the male component 110 is press-fitted into a depression, blind hole or cavity 172 formed into a surface 174 of first structure 130.

Likewise, the female component 120 may be attached to or integrated with a second structure 140 by any suitable means. In the example illustrated in FIG. 1, the female component 120 is fitted into a cavity 176 formed in the second structure 140. As a further example, the female component 120 may include a mounting bracket or feature 182 having one or more apertures 184 and 186. Fasteners (not shown) such as screws, bolts, tacks, nails, rivets, dowels, or the like may be inserted into the material (or a corresponding bore) of the second structure 140 and through apertures 184 and 186 to secure the female component 120 to second structure 140. These fasteners may securely engage the second structure 140 by any means including, but not limited to, threading, press-fitting, frictional engagement, material displacement, or the like. The female component 120 may also include a housing 190 or other stationary component such as a casing, enclosure, shell, or the like for containing internal elements of the female component 120 such as those as described below by way of example. A housing 190 may be attached to or integrated with mounting bracket 182. The cavity 176 may be configured such that the female component 120 is flush or countersunk with a surface of the second structure 140, with no part of the female component 120 protruding beyond any surface of second structure 140.

Figure 2:
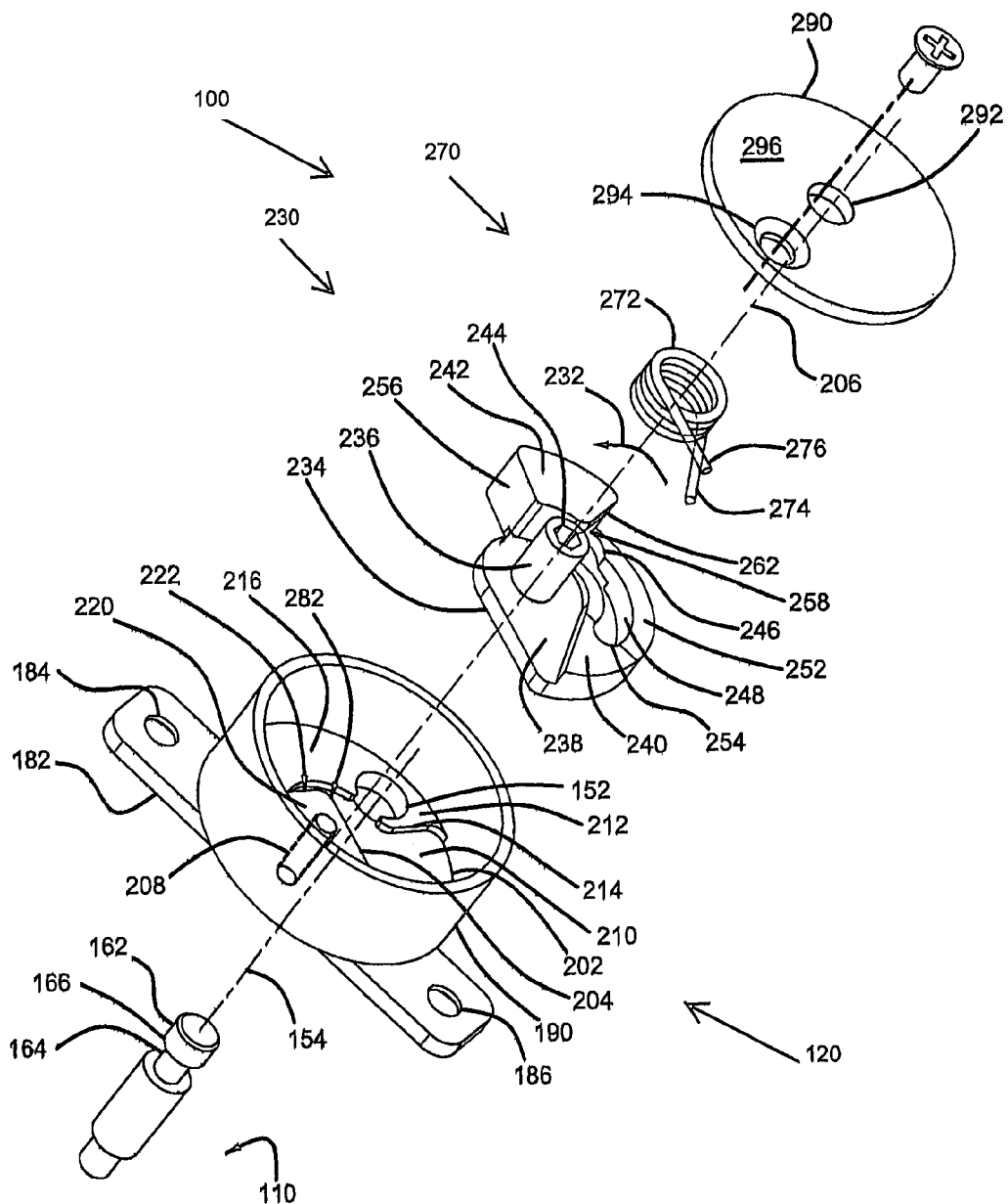
FIG. 2 is an exploded view of the fastening device illustrated in FIG. 1.

FIG. 2 is an exploded view of the fastening device 100 illustrated in FIG. 1. In addition to a first inlet aperture 152, the housing 190 of the female component 120 may include a bottom inside surface 202 having a central aperture 204 disposed about an axis of rotation 206, and a mounting aperture or bore 208 for receiving a suitable fastener (not shown). Bottom inside surface 202 of housing 190 may include a first lower or base section 210 and a first raised section 212. All or a part of first raised section 212 may have a generally arcuate shape relative to central aperture 204. A first shoulder, surface, or step 214 is defined at the interface between first lower section 210 and first raised section 212. First shoulder 214 may serve as a retaining member, or a part of a retaining member, as described further below. First inlet aperture 152 is formed through first raised section 212. First inlet aperture 152 is radially offset from central aperture 204 and is sized to receive head portion 162 of male component 110. From the perspective of FIG. 2 and axis of rotation 206, first inlet aperture 152 is located counterclockwise relative to first shoulder 214. On the side of first inlet aperture 152 opposite to 214, first raised section 212 may include a first ramped or inclined section 216 such that first raised section 212 transitions down to first lower section 210 along the counterclockwise direction. Female component 120 may also include a first block section 220 that extends generally upwardly from bottom inside surface 202 of housing 190. First block section 220 may include a first stop surface 222 located at or near the point at which first ramped section 216 merges into first lower section 210. Mounting bore 208 may be formed through first block section 220.

Female component 120 may further include a movable component such as a movable locking mechanism 230. In the example illustrated in FIG. 2, locking mechanism 230 is movable by being rotatable about axis of rotation 206 as generally indicated by an arrow 232. As described further below, locking mechanism 230 is movable between an unlocked position and a locked position. Locking mechanism 230 may include a main or base portion 234 from which other features of locking mechanism 230 may be referenced. The other features may include a mounting post 236, a second lower or base section 238, a second raised section 240, and a second block section 242. Mounting post 236, second raised section 240, and second block section 242 may extend generally upwardly from second lower section. Mounting post 236 may include a hollow portion 244 in order to receive a suitable tool (not shown) to facilitate removal of male component 110 from female component 120, as described further below. Hollow portion 244 of mounting post 236 may be shaped (e.g., hexagonal) for receiving a specific type of tool such as an Allen or hex wrench. Mounting post 236 may serve as an axle, rod, dowel, pin, or the like, about which locking mechanism 230 can rotate. In the assembly of female component 120, mounting post 236 is aligned with central aperture 204 of housing 190 about axis of rotation 206.

All or a part of second raised section 240 may be generally arcuate relative to mounting post 236 and axis of rotation 206. A second male component inlet aperture 246 is formed through second raised section 240 and is radially offset from mounting post 236. Like first inlet aperture 152 of housing 190, second inlet aperture 246 is sized to receive head portion 162 of male component 110. In addition to second inlet aperture 246, an arcuate slot 248 may be formed through second raised section 240. Arcuate slot 248 communicates with second inlet aperture 246. The width of arcuate slot 248 (i.e., the radial dimension of arcuate slot 248 relative to axis of rotation 206) is sized to receive neck portion 164 of male component 110 but is less than the diameter of second inlet aperture 246. By this configuration, as described in more detail below, head portion 162 of male component 110 can pass axially through second inlet aperture 246 only, and not axially through arcuate slot 248. Moreover, when inserted through first inlet aperture 152 and second inlet aperture 246 along axis of insertion 154, head portion 162 (and, particularly, shoulder 166 of male component 110) must completely clear the upper surface of second raised section 240 before locking mechanism 230 is able to rotate or pivot about axis of rotation 206. That is, once head portion 162 has been moved far enough upwardly, head portion 162 no longer obstructs arcuate slot 248 and, instead, neck portion 164 is aligned with arcuate slot 248. Once head portion 162 reaches this position, arcuate slot 248 is able to move relative to neck portion 164 during rotation of locking mechanism 230. Like first raised section 212 of housing 190, second raised section 240 may include a second ramped or inclined section 252 such that second raised section 240 transitions down to second lower section 238 of locking mechanism 230 along a counterclockwise direction. All or part of arcuate slot 248 may be located in the area of second ramped section 252. In either case, second ramped section 252 has a minimum elevation above second lower section 238 at a point at or near second inlet aperture 246 and a maximum elevation above second lower section 238 at a point along arcuate slot 248. In the illustrated implementation, the elevation of second ramped section 252 reaches a maximum at or near an end 254 of arcuate slot 248 that is opposite to the interfacial opening between arcuate slot 248 and second inlet aperture 246.

Second block section 242 of female component 120 may include a second stop surface 256 that is located on a side of second block section 242 opposite to second inlet aperture 246. Second stop surface 256 extends generally upwardly from base portion 234 of locking mechanism 230 in the same orientation as first stop surface 222 of housing 190. Accordingly, in some implementations, second stop surface 256 may be moved into abutment with first stop surface 222 upon rotation of locking mechanism 230, as described further below. A recess 258 may be formed in second block section 242. A portion of recess 258 generally facing second inlet aperture 246 may serve as a contact surface 262, the purpose of which is described below.

Female component 120 may further include a component of any suitable design that is capable of storing and releasing energy so as to effect or assist in mechanical displacement. In the example illustrated in FIG. 2, the energy-storing element is a biasing element 270 such as a spring. Biasing element 270 may be constructed from a suitable metal including, but not limited to, steel, brass, bronze, aluminum, beryllium, copper, alloys comprising one or more of the foregoing, and the like. Alternatively, biasing element 270 may be constructed from a suitable solid, foamed, or cross-linked elastomer including, but not limited to, natural rubber, neoprene, polyurethane, silicone, nitrile, EPDM (ethylene-propylene-diene monomer), polyethylene, vinyl, gum rubber, latex, styrene-butadiene rubber, VITON®, polyester, ECH (epichlorohydrin), butyl, polystyrene, and the like. Biasing element 270 may be constructed from a length of material such as a wire having any suitable cross-section (e.g., round, square, or flat) or from a sheet, and may be shaped, forged, molded, or machined into any suitable configuration including, but not limited to, a flat, coiled, single- or multi-leaf, single or stacked shim, C-clip, dome, block, or arched configuration.

In the example illustrated in FIG. 2, biasing element 270 includes a wound or a coiled section 272 and two end sections 274 and 276. Biasing element 270 may be mounted coaxially about mounting post 236 of locking mechanism 230. By appropriately positioning biasing element 270 relative to other features of female component 120, end sections 274 and 276 of biasing element 270 may be forced into abutment with selected surfaces of female component 120 such that biasing element 270 stores energy while locking mechanism 230 is held in the unlocked position. For instance, end section 274 may abut an interfacial surface 278 between second lower section 238 and second raised section 240 of locking mechanism 230, and end section 276 may abut a side 282 of first block section 220 of housing 190. As a result, end sections 274 and 276 are deflected generally towards each other and biasing element 270 is brought into a state at which it stores potential energy. By causing locking mechanism 230 to move from the unlocked position to the locked position in a manner described below, biasing element 270 can transition from its stored-energy state to a state at which the energy is released.

In other implementations, the energy-storing element may store and release energy in other forms such as, for example, compressed gas, chemical energy, or magnetic energy.

Female component 120 may further include a cover, lid, or end plate 290 for positioning onto the open end of housing 190 to enclose internal components of female component 120 such as locking mechanism 230 and biasing element 270. End plate 290 may include a centrally located aperture 292 and a mounting aperture 294 offset from centrally located aperture 292. Mounting post 236 of locking mechanism 230 may extend partially or fully through centrally located aperture 292 such that mounting post 236 is rotatable within centrally located aperture 292. Mounting aperture 294 may be located so as to be aligned with mounting bore 208 of first block section 220, such that end plate 290 may be secured to housing 190 with a suitable fastener (not shown). In the exemplary implementation illustrated in FIG. 2, mounting aperture 294 has a countersunk profile to enable a fastener to be fully installed without protruding above an outer surface 296 of end plate 290. By way of example, mounting aperture 294 may have a particular profile (e.g., beveled) to accommodate the head of a fastener having a complementary profile.

Figure 3:
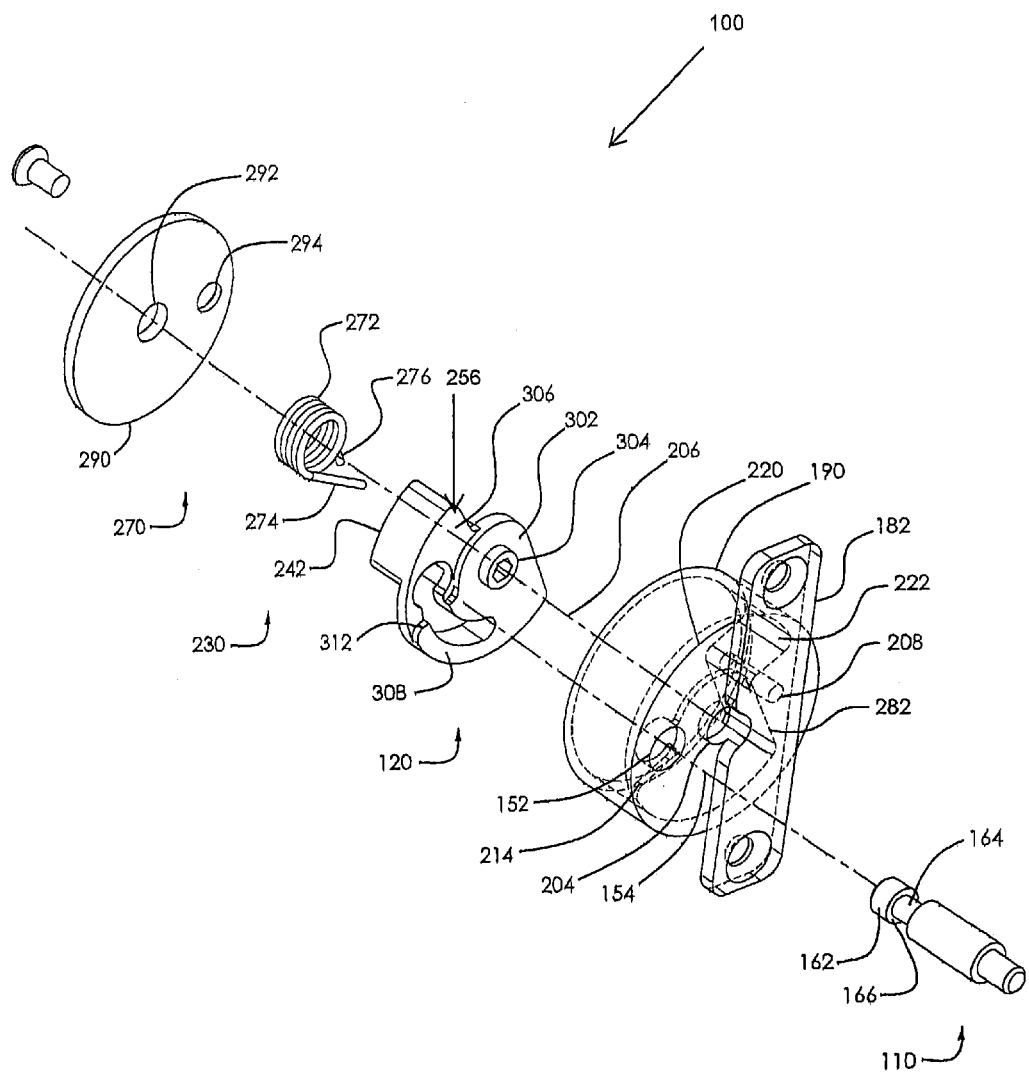
FIG. 3 is another exploded view of the fastening device illustrated in FIG. 1.

FIG. 3 is another exploded view of fastening device 100 from a different angle as compared to FIG. 2. FIG. 3 illustrates additional features that may be included with locking mechanism 230. Locking mechanism 230 may include a bottom outside surface 302 generally facing bottom inside surface 202 (FIG. 2) of housing 190. A portion 304 of mounting post 236 (FIG. 2), or a separate portion 304 axially aligned with mounting post 236, may extend downwardly from bottom outside surface 302. Hence, in the assembly of female component 120, this portion 304 extends partially or fully into central aperture 204 of housing 190 and is rotatable within central aperture 204 during rotation of locking mechanism 230 about axis of rotation 206. A section 306 of bottom outside surface 302 corresponding to second raised section 240 (FIG. 2) of locking mechanism 230 is elevated above another section 308 of bottom outside surface 302 corresponding to second lower section 238 (FIG. 2) of locking mechanism 230. Accordingly, a second shoulder, surface, or step 312 is defined at the interface between sections 306 and 308. From FIGS. 2 and 3, it may be seen that second shoulder 312 of locking mechanism 230 abuts against first shoulder 214 of bottom inside surface 202 of housing 190 when locking mechanism 230 is in the unlocked position. First shoulder 214 and/or second shoulder 312 may be characterized as serving as a retaining member that holds locking mechanism 230 in the unlocked position against the biasing force imparted on locking mechanism 230 by biasing element 270.

The operation of fastening device 100 and the interaction of its various features will now be described with reference to FIGS. 4-8. Generally, FIGS. 4-8 illustrate a sequence of events that may occur in the process of securely fastening male component 110 of fastening device 100 to female component 120 and thus, in some implementations, securely fastening together two structures with which male component 110 and female component 120 are respectively associated (e.g., first structure 130 and second structure 140 illustrated in FIGS. 1 and 4-8).

Figure 4:
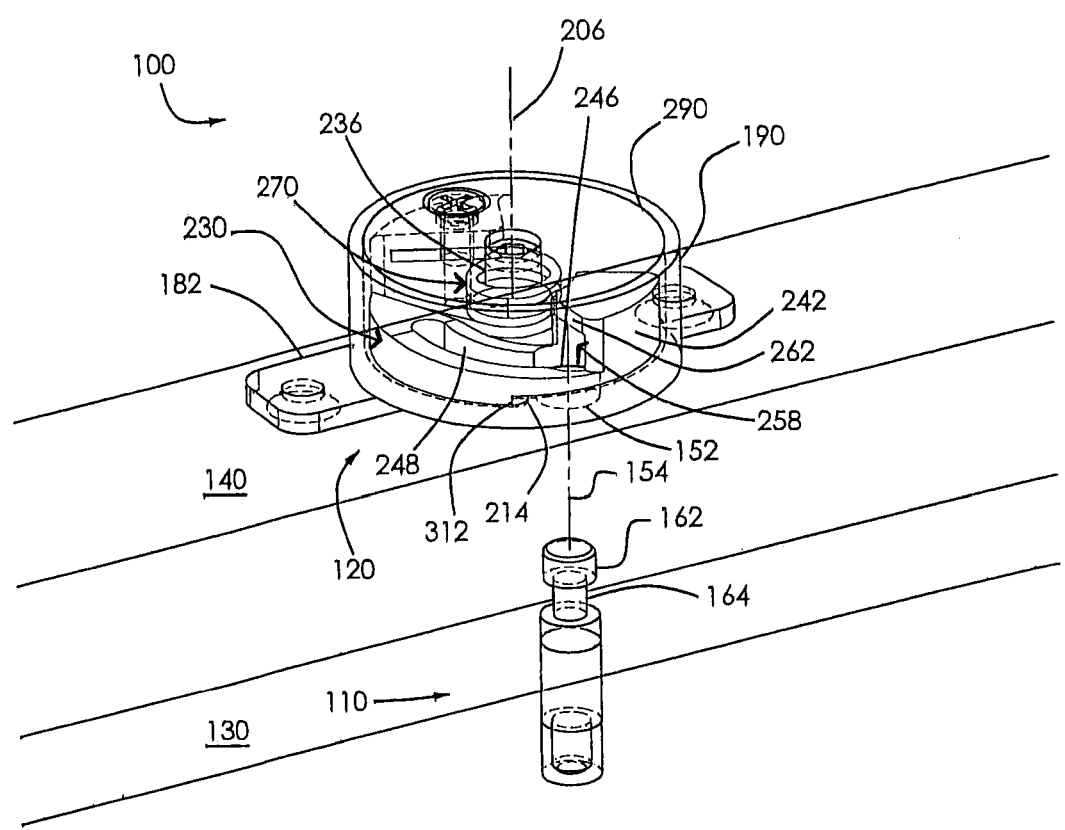
FIG. 4 is a perspective view of the fastening device illustrated in FIG. 1 in which a male component is separated from a female component, and further illustrating internal components of the female component.

FIG. 4 illustrates fastening device 100 in an unfastened state, i.e., prior to insertion of male component 110 into female component 120. Locking mechanism 230 of female component 120 is positioned in the unlocked, or cocked, position. At the unlocked position, second inlet aperture 246 of locking mechanism 230 is aligned with first inlet aperture 152 of housing 190. Contact surface 262 formed in recess 258 of second block section 242 of locking mechanism 230 is located at least partially above second inlet aperture 246, such that contact surface 262 at least partially obstructs the path of male component 110 along axis of insertion 154. As described above, biasing element 270 is interfaced between structural features of housing 190 and locking mechanism 230 in such a manner that biasing element 270 imparts a force on locking mechanism 230 in a resultant direction tangential to a counterclockwise direction about axis of rotation 206. In other words, if movement of locking mechanism 230 were unconstrained, biasing element 270 would cause locking mechanism 230 to rotate about mounting post 236 in the counterclockwise direction. However, in the unlocked position illustrated in FIG. 4, second shoulder 312 of locking mechanism 230 abuts first shoulder 214 of housing 190 under the force provided by biasing element 270. Consequently, locking mechanism 230 is held in the unlocked position while fastening device 100 is in the unfastened state—i.e., while male component 110 is separated from female component 120—and potential energy is stored in biasing element 270.

Figure 5:
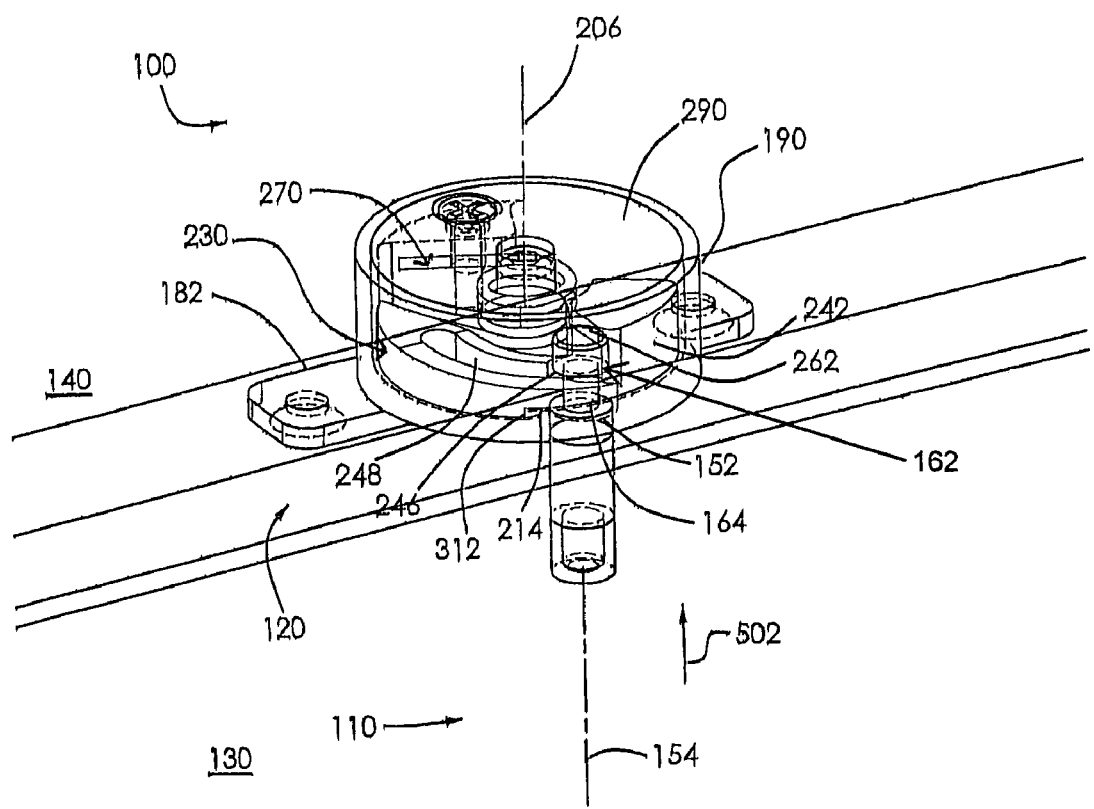
FIG. 5 is a perspective view of the fastening device illustrated in FIG. 1 in which the male component has been inserted into the female component while the fastening device is in an unlocked position.

FIG. 5 illustrates fastening device 100 after insertion of male component 110 into female component 120, but while locking mechanism 230 is still being held in the unlocked position. The insertion of male component 110 into female component 120 is generally indicated by an arrow 502. Male component 110 has been moved far enough along axis of insertion 154 so that head portion 162 has passed through first inlet aperture 152 of housing 190 and second inlet aperture 246 of locking mechanism 230. The manner by which male component 110 is inserted into female component 120 depends on the operating environment in which fastening device 100 is being implemented. For instance, in a case where male component 110 is attached to or integrated with first structure 130 and female component 120 is attached to or integrated with second structure 140 (e.g., where first structure 130 and second structure 140 are furniture parts to be assembled together), first structure 130 may be aligned with second structure 140 so that head portion 162 is aligned with first inlet aperture 152 and then first structure 130 moved toward second structure 140, second structure 140 moved toward first structure 130, or first structure 130 and second structure 140 moved simultaneously toward each other.

At the point in time illustrated in FIG. 5, head portion 162 may have come into contact with contact surface 262 of locking mechanism 230. However, head portion 162 has not been moved far enough into female component 120 along the axis of insertion 154 to displace locking mechanism 230, and thus locking mechanism 230 is still held in the unlocked position. Additionally, or alternatively, head portion 162 has not been moved fully past second inlet aperture 246, and thus head portion 162 obstructs arcuate slot 248 and prevents any rotation by locking mechanism 230 about axis of rotation 206.

Figure 6:
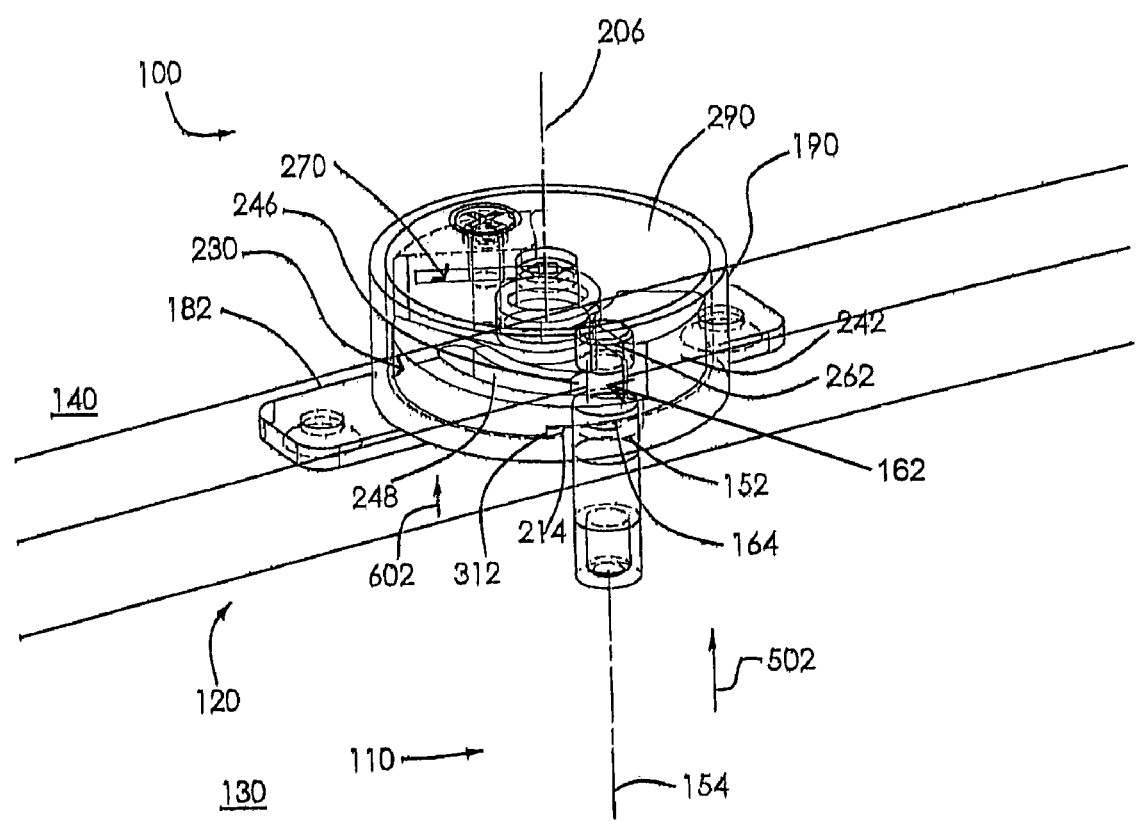
FIG. 6 is a perspective view of the fastening device illustrated in FIG. 1 in which the male component has been further inserted into female component to release the fastening device from the unlocked position.

FIG. 6 illustrates fastening device 100 after further insertion of male component 110 into female component 120, and while locking mechanism 230 is being released from its unlocked position within female component 120. At the point in time illustrated by FIG. 6, male component 110 has been moved far enough along axis of insertion 154 so that head portion 162 has completely cleared second inlet aperture 246. Moreover, as a result of head portion 162 bearing on contact surface 262 of locking mechanism 230 and exerting an axial force on contact surface 262, male component 110 has caused locking mechanism 230 to be axially displaced. Consequently, locking mechanism 230 is lifted far enough upwardly that second shoulder 312 of locking mechanism 230 is displaced relative to first shoulder 214 of housing 190, as generally indicated by an arrow 602. Hence, second shoulder 312 moves out of engagement with first shoulder 214. In effect, the retaining function of first shoulder 214 and second shoulder 312 has been disabled, thereby enabling locking mechanism 230 to rotate in a counterclockwise direction under the biasing force of biasing element 270. Moreover, neck portion 164 of male component 110 now resides in the space defined by second inlet aperture 246 and thus is aligned with arcuate slot 248.

Figure 7:
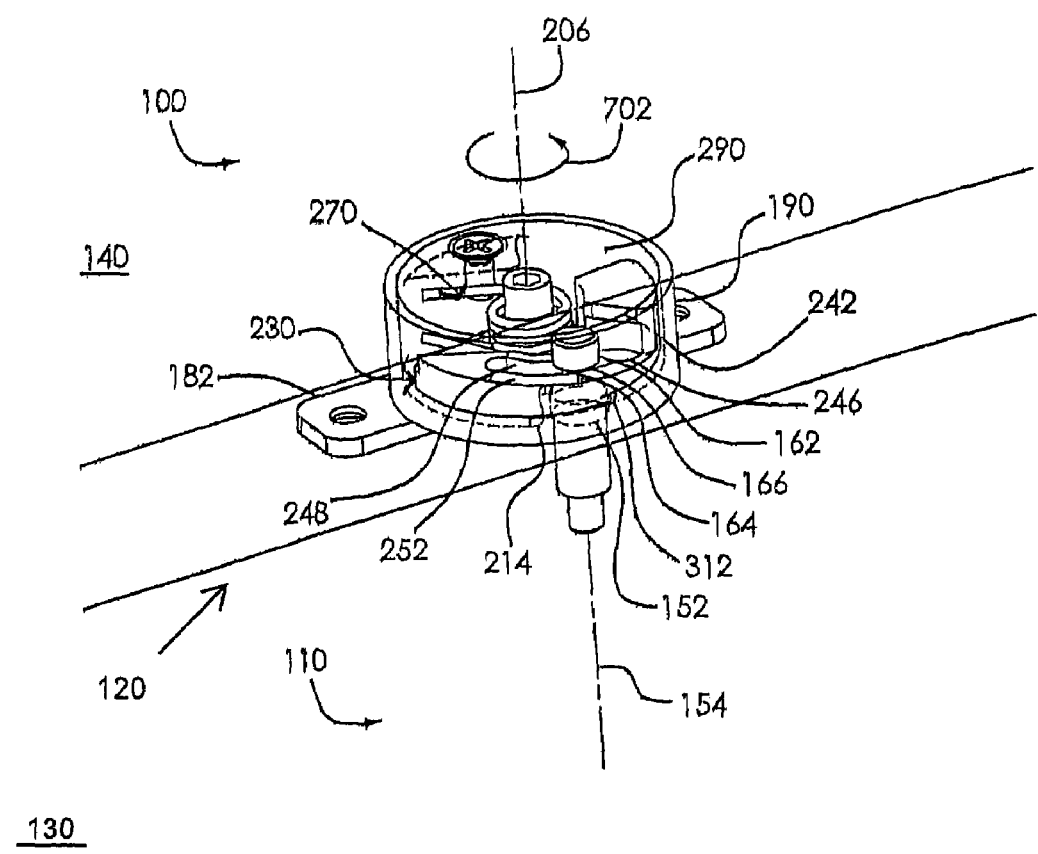
FIG. 7 is a perspective view of the fastening device illustrated in FIG. 1 in which a locking mechanism of the female component has begun to move from the unlocked position toward a locked position.

FIG. 7 illustrates fastening device 100 while locking mechanism 230 is moving from its unlocked position toward its locked position. At the point in time illustrated in FIG. 7, the biasing force provided by biasing element 270 is causing locking mechanism 230 to rotate in the counterclockwise direction as indicated generally by an arrow 702. As appreciated by persons skilled in the art, the potential energy stored by biasing element 270 is converted to kinetic energy during rotation of locking mechanism 230. Because neck portion 164 of male component 110 is at an elevation at which neck portion 164 is aligned with arcuate slot 248 of locking mechanism 230, the surfaces of locking mechanism 230 defining second inlet aperture 246 and arcuate slot 248 can pass around the outer periphery of neck portion 164 as locking mechanism 230 rotates. Eventually, shoulder 166 defined between head portion 162 and neck portion 164 encounters second ramped section 252 of locking mechanism 230. Accordingly, upon further rotation of locking mechanism 230, second ramped section 252 may serve as a cam, forcing male component 110 to be drawn further into female component 120 as rotation proceeds. The biasing force provided by biasing element 270 is strong enough to facilitate this self-tightening action. In implementations where housing 190 includes first ramped section 216 (see FIG. 2), locking mechanism 230 rides down first ramped section 216 during rotation, which may accommodate the interaction of male component 110 and locking mechanism 230 during the rotation.

Figure 8:
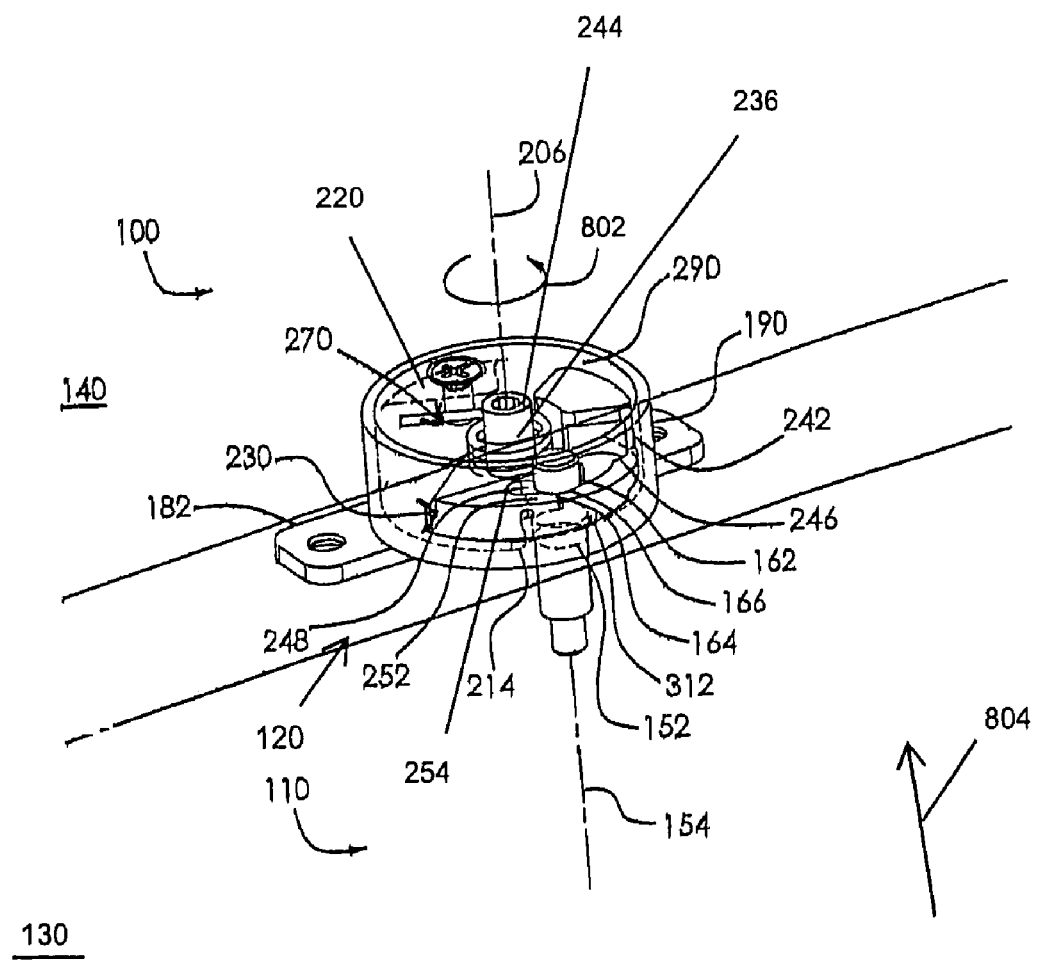
FIG. 8 is a perspective view of the fastening device illustrated in FIG. 1 in which the locking mechanism has moved to a locked position.

FIG. 8 illustrates fastening device 100 at a point in time when, as compared to FIG. 7, locking mechanism 230 has rotated further (as indicated generally by an arrow 802) and male component 110 has been drawn further into female component 120 (as indicated generally by an arrow 804). In one implementation, FIG. 8 may represent the point in time when biasing element 270 has fully released its stored energy such that locking mechanism 230 has reached the locked position and does not rotate further. In another implementation, the locked position may correspond to a point in time when male component 110 encounters end 254 of arcuate slot 248 of locking mechanism 230 such that, in effect, male component 110 (or its neck portion 164, see, e.g., FIG. 7), serves as a stop element for locking mechanism 230. In yet another implementation, the locked position may correspond to a point in time when second block section 242 of locking mechanism 230 encounters first block section 220 of housing 190. In any of these implementations, the locked position corresponds to a state of fastening device 100 at which male component 110 and female component 120 (and any structural components with which male component 110 and female component 120 are respectively associated) are fully secured to each other and male component 110 cannot be removed from female component 120.

In some implementations, disassembly of female component 120 may be required in order to disengage male component 110 from female component 120 after the locked position has been attained. In other implementations, removal of male component 110 from female component 120 may be effected by inserting a suitable tool (not shown) into hollow portion 244 of mounting post 236, and utilizing the tool to rotate locking mechanism 230 in the clockwise direction with a torque sufficient to overcome the force or resistance imparted by biasing element 270. Once head portion 162 of male component 110 becomes aligned with first inlet aperture 152 and second inlet aperture 246 (see, e.g., FIG. 4), male component 110 may be removed from female component 120.

A self-tightening fastening device according to an example of another implementation will now be described with reference to FIGS. 9-17.

Figure 9:
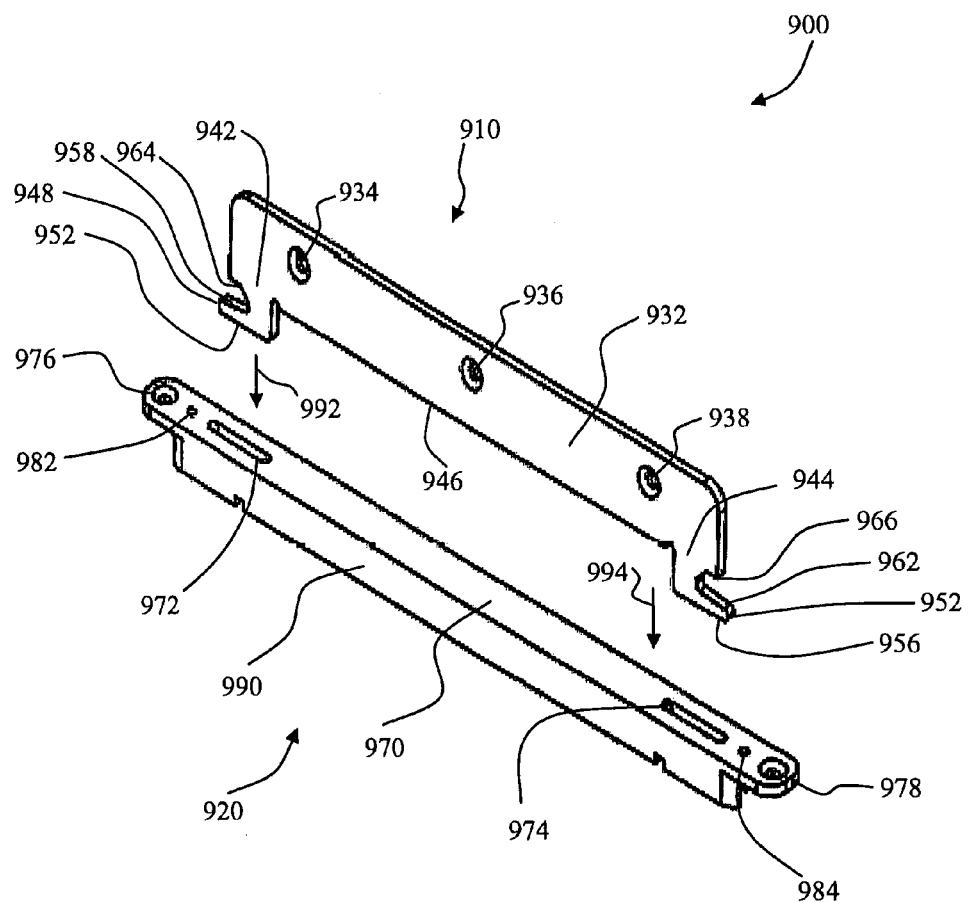
FIG. 9 is a perspective view of a fastening device according to an example of another implementation.

FIG. 9 is a perspective view of a fastening device 900. Fastening device 900 includes a male component 910 and a female component 920. In the implementation illustrated in FIG. 9, male component 910 may include a main portion 932. Main portion 932 may be structured as an elongated flat plate. One or more mounting apertures 934, 936, and 938 may be formed through a thickness of main portion 932. Male component 910 may further include one or more protrusions or extensions 942 and 944 such as, for example, arms, fingers or hooks. For example, male component 910 may include two protrusions 942 and 944. Protrusions 942 and 944 depend from an edge 946 of main portion 932. Protrusions 942 and 944 may include respective tips 948 and 952 generally pointing away from each other. Respective outer edges 954 and 956 are disposed on one side of tips 948 and 952 and generally face away from edge 946 of main portion 932. Respective inner edges 958 and 962 are disposed on the opposite side of tips 948 and 952 and generally face toward edge 946 of main portion 932. In some implementations, inner edges 958 and 962 are ramped, inclined, or angled relative to outer edges 954 and 956 and/or edge 946 of main portion 932 as shown for example in FIG. 9. Respective concave sections 964 and 966 may be interposed between, and generally adjoin, inner edges 958 and 962 and main portion 932.

Female component 920 may include a base portion 970 that may be structured as an elongated flat plate. Base portion 970 may have one or more first male component inlet apertures 972 and 974 corresponding to the number of protrusions 942 and 944 of male component 910—for example, two first inlet apertures 972 and 974. Each first inlet aperture 972 or 974 may have an elongated or generally linear shape and in some implementations may be characterized as a slot. Base portion 970 may also have one or more mounting apertures 976 and 978 and one or more threaded apertures 982 and 984. Female component 920 may further include a housing 990 or other stationary component such as a casing, enclosure, shell, or the like for containing internal elements of female component 920 such as those described below by way of example. Housing 990 depends from base portion 970, and may be attached to or integrated with base portion 970 by any means.

In this implementation, male component 910 may be fastened to female component 920 by inserting protrusions 942 and 944 into corresponding first inlet apertures 972 and 974 generally along respective axes, paths, or directions of insertion 992 and 994. As described below, fastening device 900 is configured such that this insertion causes energy stored by female component 920 to be released. The energy so released causes female component 920, or portions of female component 920, to move from an initially unlocked state to a locked state, and concomitantly causes male component 910 to be locked within female component 920. As a result, any structural objects with which male component 910 and female component 920 may be associated may be securely fastened together. In some implementations, the mechanical displacement caused by the release of energy may cause protrusions 942 and 944 of male component 910 to be drawn further into female component 920 to enhance securement.

Figure 10:
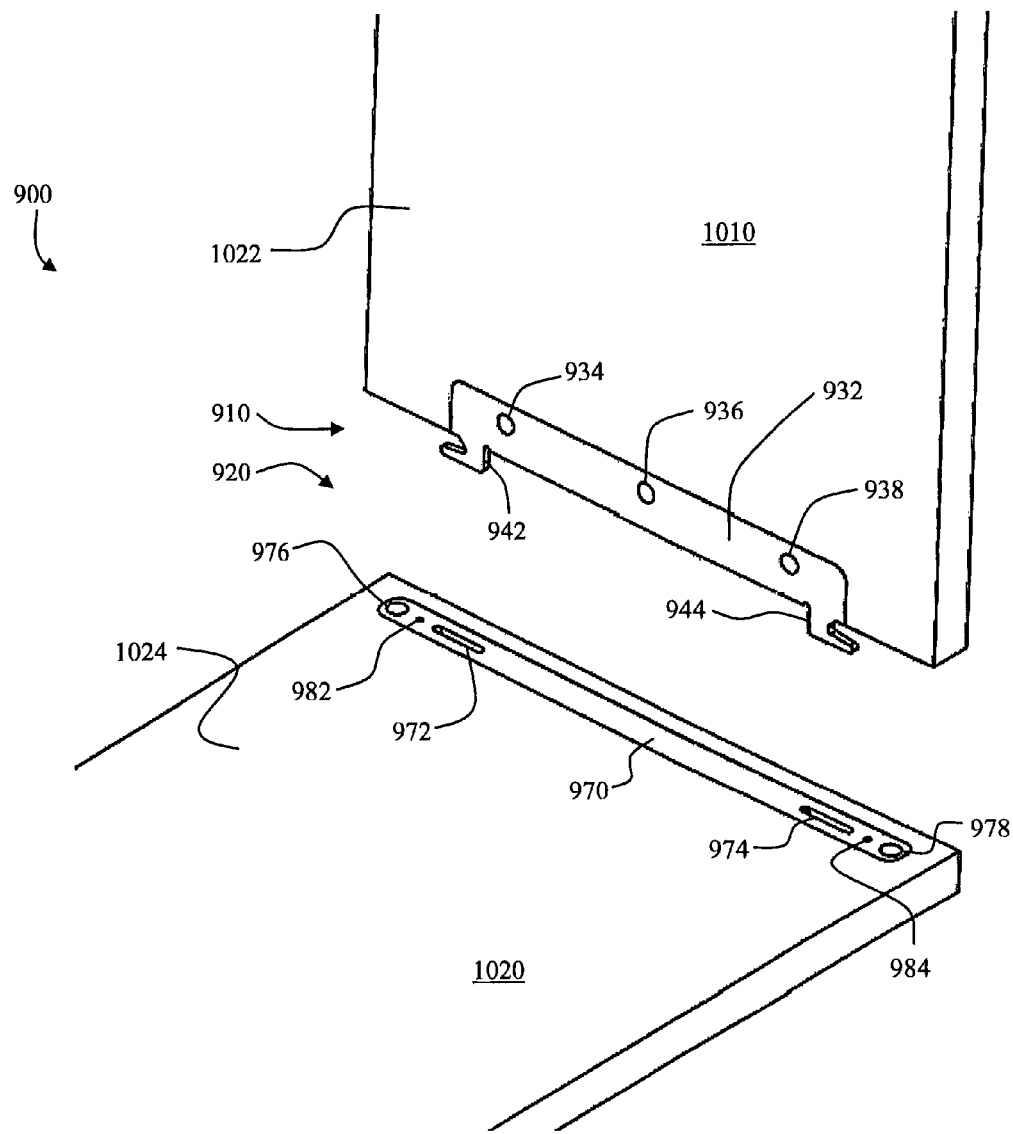
FIG. 10 is a perspective view of the fastening device illustrated in FIG. 9 in which a male component and a female component of the fastening device have been attached to or integrated with respective structures to be assembled.

FIG. 10 is a perspective view of fastening device 900 in which male component 910 and female component 920 have been respectively attached to or integrated with a first structure 1010 and a second structure 1020. As previously noted, no limitation is placed on the nature of first structure 1010 and second structure 1020 in terms of the types of structures or their respective compositions. Generally, first structure 1010 and second structure 1020 may be any objects that are to be assembled, secured, or fastened together, such as pieces of furniture. Male component 910 may be attached to or integrated with first structure 1010 by any suitable means. In the example illustrated in FIG. 10, male component 910 is attached to first structure 1010 by inserting suitable fasteners (not shown) through mounting apertures 934, 936, and 938 of main portion 932. A recess or cavity (not shown) may be formed in first structure 1010 to receive main portion 932 of male component 910 such that main portion 932 is flush with an outer surface 1022 of first structure 1010. Likewise, female component 920 may be attached to or integrated with second structure 1020 by any suitable means. In the example illustrated in FIG. 10, female component 920 is attached to second structure 1020 by inserting suitable fasteners (not shown) through mounting apertures 976 and 978 of base portion 970.

A recess or cavity (not shown) may be formed in second structure 1020 to receive base portion 970 and housing 990 of female component 920 such that base portion 970 is flush with an outer surface 1024 of second structure 1020. The fasteners employed to respectively secure male component 910 and female component 920 to first structure 1010 and second structure 1020 may include, but are not limited to, screws, bolts, tacks, nails, rivets, dowels, or the like. The fasteners may securely interact with first structure 1010 and second structure 1020 by any means including, but not limited to, threading, press-fitting, frictional engagement, material displacement, or the like.

Figure 11:
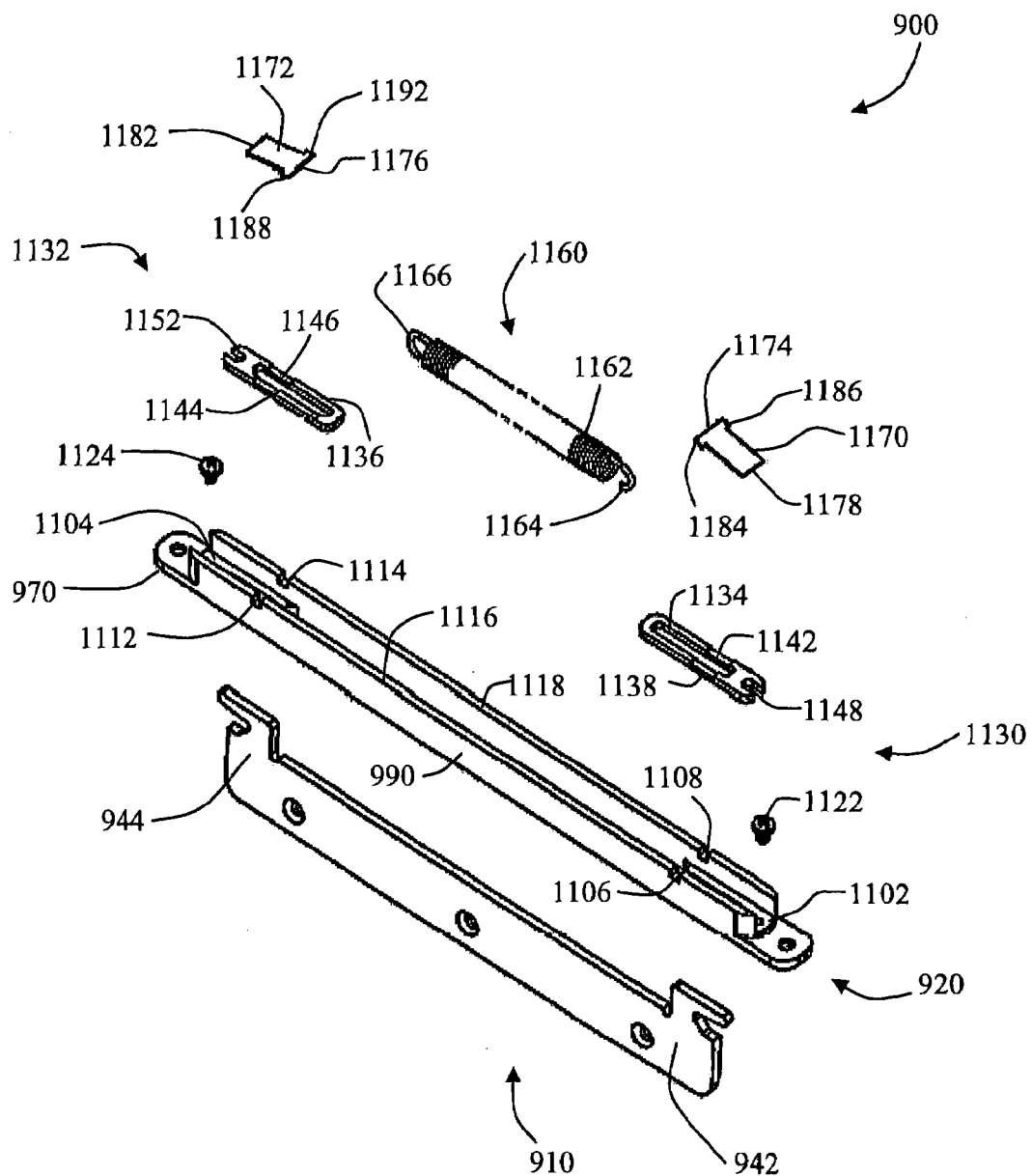
FIG. 11 is a perspective exploded view of the fastening device illustrated in FIG. 9.

FIG. 11 is an exploded view of fastening device 900 in unassembled form and illustrates several internal elements and other features of female component 920. Housing 990 of female component 920 may include raised sections 1102 and 1104 disposed in the vicinity of corresponding first inlet apertures 972 and 974 (see FIGS. 9 and 10). First inlet apertures 972 and 974 and threaded apertures 982 and 984 (see FIGS. 9 and 10) may be formed through the thicknesses of corresponding raised sections 1102 and 1104 as well as through the thickness of base portion 970. One or more first cut-out sections, recesses, or notches 1106, 1108, 1112, and 1114 may be formed in one or more edges 1116 and 1118 of housing 990 proximate to first inlet apertures 972 and 974. First notches 1106, 1108, 1112, and 1114 facilitate a retaining function of female component 920 as described further below. Female component 920 may further include retainer screws 1122 and 1124 for mating engagement with corresponding threaded apertures 982 and 984.

Female component 920 may further include a movable component such as one or more movable locking mechanisms 1130 and 1132. As described further below, locking mechanisms 1130 and 1132 are linearly movable between an unlocked position and a locked position. Locking mechanisms 1130 and 1132 may include respective second male component inlet apertures 1134 and 1136, second notches 1138, 1142, 1144 and 1146, and end recesses 1148 and 1152. Like first inlet apertures 972 and 974, second inlet apertures 1134 and 1136 may be shaped as generally linear slots. In the assembly of female component 920, second inlet apertures 1134 and 1136 may be generally aligned with corresponding first inlet apertures 972 and 974 and end recesses 1148 and 1152 may be generally aligned with corresponding threaded apertures 982 and 984.

Female component 920 may further include a component of any suitable design that is capable of storing and releasing energy so as to effect or assist in mechanical displacement. In the example illustrated in FIG. 11, the energy-storing element is a biasing element 1160 such as a spring. Biasing element 1160 may include a wound or a coiled section 1162 and two end sections 1164 and 1166. End sections 1164 and 1166 may have arcuate or hooked shapes so as to facilitate their respective engagement with locking mechanisms 1130 and 1132 as described below.

Female component 920 may further include one or more retaining or trigger members 1170 and 1172—for example, two retaining members 1170 and 1172. Each retaining member 1170 or 1172 may be provided generally in the form of a flat plate. Retaining members 1170 and 1172 may include, respectively, first retaining member ends 1174 and 1176 and opposing second retaining member ends 1178 and 1182. In some implementations, the width of each first retaining member end 1174 and 1176 may be greater than the width of each second retaining member end 1178 and 1182. Additionally, the width of each first retaining member end 1174 or 1176 may be greater than the width between edges 1116 and 1118 of housing 990, and the width of each second retaining member end 1178 or 1182 may be less than the width between edges 1116 and 1118. Each retaining member 1170 or 1172 may have a shape, such as a T-shape, with the result that opposing pairs of tabs 1184, 1186 and 1188, 1192 are respectively formed at first retaining member ends 1174 and 1176 of retaining members 1170 and 1172. By this configuration, in the assembly of female component 920 into its unlocked position, each pair of tabs 1184, 1886 and 1188, 1192 may be supported in the corresponding pair of first notches 1106, 1108 and 1112, 1114 of housing 990. As described below, the remaining portions of retaining members 1170 and 1172 extend downwardly into the interior of housing 990 at an angle while female component 920 is in the unlocked position, and second retaining member ends 1178 and 1182 are respectively supported in the pairs of second notches 1106, 1108 and 1112, 1114 of locking mechanisms 1130 and 1132.

Figure 12:
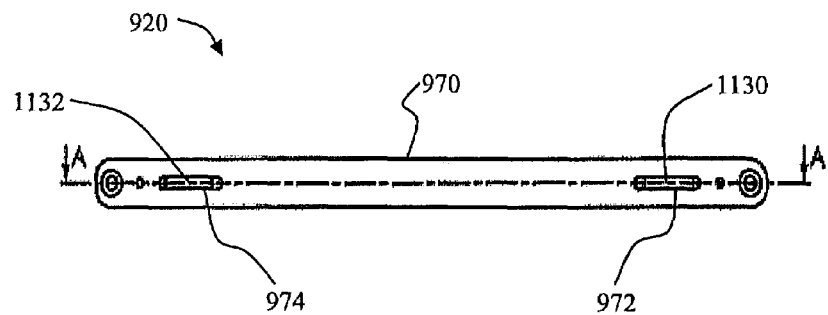
FIG. 12 is a plan view of the female component of the fastening device illustrated in FIG. 9 while the female component is in an unlocked position.

FIG. 12 is a plan view of female component 920 in assembled form from the perspective of the side of base portion 970 opposite to housing 990 (FIG. 11). Locking mechanisms 1130 and 1132 are visible through respective first inlet apertures 972 and 974, as well as corresponding second inlet apertures 1134 and 1136 (FIG. 11).

Figure 13:
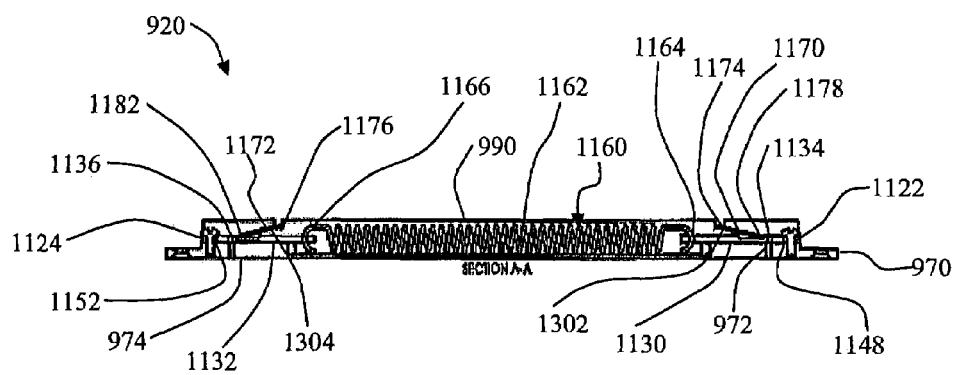
FIG. 13 is a cross-sectional elevation view of the female component illustrated in FIG. 12, taken along line A-A of FIG. 12.

FIG. 13 is a cut-away, side elevation view of female component 920 in assembled form, taken along line A-A of FIG. 12. When assembled, female component 920 is initially in an unlocked, or cocked, position. The unlocked position also corresponds to a state in which male component 910 (FIGS. 9-11) is separated from (i.e., not yet inserted into) female component 920. Locking mechanisms 1130 and 1132 are disposed on respective raised sections 1102 and 1104 of housing 990. As previously noted, second inlet apertures 1134 and 1136 (see also FIG. 11) of locking mechanisms 1130 and 1132 are aligned with corresponding first inlet apertures 972 and 974 (see also FIG. 12) of housing 990. Retaining members 1170 and 1172 may include respective contact surfaces 1302 and 1304 generally facing first inlet apertures 972 and 974 and second inlet apertures 1134 and 1136. Locking mechanisms 1130 and 1132 are held in the unlocked position by retaining members 1170 and 1172. Specifically, first retaining member ends 1174 and 1176 of locking mechanisms 1130 and 1132 are respectively disposed in first notches 1106, 1108, 1112, and 1114 (see FIG. 11) of housing 990 and second retaining member ends 1178 and 1182 of locking mechanisms 1130 and 1132 are respectively disposed in second notches 1138, 1142, 1144, and 1146 (see FIG. 11) of locking mechanisms 1130 and 1132. Hence, retaining members 1170 and 1172 extend at an angle downwardly through housing 990 toward base portion 970. By this configuration, contact surfaces 1302 and 1304 of retaining members 1170 and 1172 are easily accessible from the side of female component 920 at which base portion 970 is disposed via corresponding first inlet apertures 972 and 974 and second inlet apertures 1134 and 1136.

Biasing element 1160 is disposed in housing 990 and is oriented such that its coiled section 1162 is interposed between locking mechanisms 1130 and 1132. End sections 1164 and 1166 of biasing element 1160 respectively engage locking mechanisms 1130 and 1132 by extending through respective second inlet apertures 1134 and 1136 of locking mechanisms 1130 and 1132. Biasing element 1160 is configured such that coiled section 1162 is stretched in tension while biasing element 1160 is in the unlocked position. Accordingly, biasing element 1160 stores potential energy while in this position. Moreover, due to the coupling of end sections 1164 and 1166 with corresponding locking mechanisms 1130 and 1132, biasing element 1160 imparts a biasing force on each locking mechanism 1130 and 1132. From the perspective of FIG. 13, the biasing forces are directed generally toward the center of female component 920. If movement of locking mechanisms 1130 and 1132 were unconstrained, biasing element 1160 would cause locking mechanisms 1130 and 1132 to translate toward each other along generally linear directions. However, in the unlocked position illustrated in FIG. 13, retaining members 1170 and 1172 hold corresponding locking mechanisms 1130 and 1132 in the unlocked position against the biasing forces imparted on locking mechanisms 1130 and 1132 by biasing element 1160. These biasing forces cause respective second notches 1138, 1142, 1144, and 1146 of locking mechanisms 1130 and 1132 to bear against second retaining member ends 1178 and 1182, and first retaining member ends 1174 and 1176 to bear against first notches 1106, 1108, 1112, and 1114 of housing 990. By causing locking mechanisms 1130 and 1132 to move from the unlocked position to the locked position in a manner described below, biasing element 1160 can transition from its stored-energy state to a state at which the energy is released.

As previously noted, female component 920 may include retainer screws 1122 and 1124 for insertion through corresponding end recesses 1148 and 1152 of locking mechanisms 1130 and 1132 and into mating engagement with corresponding threaded apertures 982 and 984 of base portion 970 of female component 920. Retainer screws 1122 and 1124 may serve one or more functions. Retainer screws 1122 and 1124 may cooperate with end recesses 1148 and 1152 as guide means to maintain a proper orientation of locking mechanisms 1130 and 1132 during translation from the unlocked position to the locked position. In addition, or alternatively, retainer screws 1122 and 1124 may be utilized to assist in assembling female component 920 into the initial unlocked position. Specifically, retainer screws 1122 and 1124 may be tightened so as to bear down onto locking mechanisms 1130 and 1132 at end recesses 1148 and 1152 and thus hold locking mechanisms 1130 and 1132 in place while retaining members 1170 and 1172 are properly installed and biasing element 1160 is pre-loaded in tension and connected to locking mechanisms 1130 and 1132. The biasing forces imparted to locking mechanisms 1130 and 1132 during the transition from the unlocked state to the locked state may be of sufficient magnitude to overcome the bearing forces imparted by retainer screws 1122 and 1124 onto locking mechanisms 1130 and 1132. Alternatively, after assembly of female component 920, retainer screws may be loosened to enable biasing element 1160 to actuate locking mechanisms 1130 and 1132 from the unlocked state to the locked state.

Figure 14:
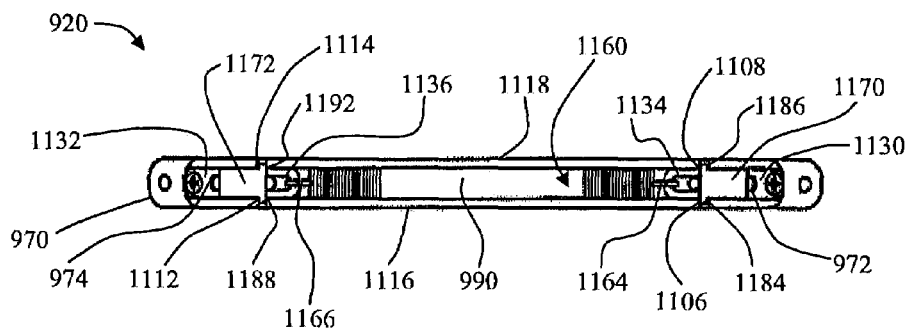
FIG. 14 is a plan view of the female component in the unlocked position, illustrating a side of the female component opposite to that shown in FIG. 12.

FIG. 14 is a plan view of female component 920 while in the assembled, unlocked position, from the perspective of the open side of housing 990 of female component 920. FIG. 14 illustrates the relative positions of various features of female component 920 while in the unlocked position. The pairs of tabs 1184, 1186 and 1188, 1192 of respective retaining members 1170 and 1172 are disposed in the corresponding pairs of first notches 1106, 1108, 1112, and 1114 of housing 990. Retaining members 1170 and 1172 may occlude a significant area of first inlet apertures 972 and 974 and second inlet apertures 1134 and 1136, respectively. This configuration ensures actuating contact between retaining members 1170 and 1172 and male component 910 (FIGS. 9-11) as described below.

The example of fastening device 900 described above and illustrated, for example, in FIG. 14 may be characterized as a two-sided, substantially symmetrical implementation. From this disclosure (see, e.g., FIG. 14), it may be appreciated by persons skilled in the art that fastening device 900 may alternatively be provided as a one-sided implementation (not specifically shown). A one-sided implementation may include, for instance, only one first inlet aperture 972, one pair of first notches 1106 and 1108, one locking mechanism 1130 (and thus one second inlet aperture 1134, one pair of second notches 1138 and 1142, and one end recess 1148), one retaining member 1170, and one retainer screw 1122. In the one-sided implementation, one end (not shown) of biasing element opposite to locking mechanism 1130 may be anchored to an appropriate portion of housing 990 so that biasing element 1160 can attain the stored-energy and released-energy states. Similarly, in other two-sided implementations, the energy-storing element provided with female component 920 may include two biasing elements (which may be similar to biasing element 1160), with one end of each biasing element 1160 being connected with a respective locking mechanism 1130 and 1132 as previously described and an opposing end anchored to housing 990 appropriately.

Figure 15:
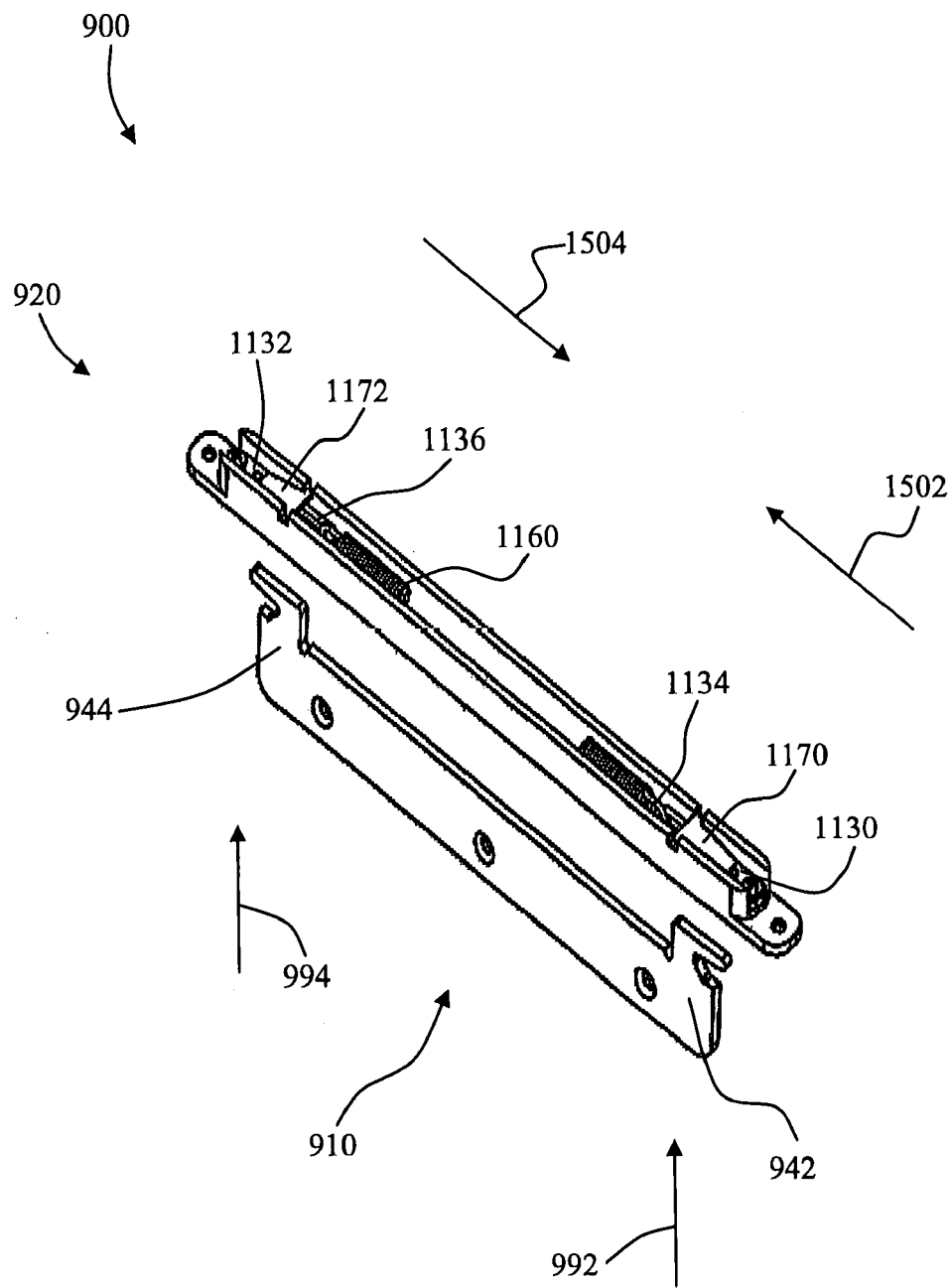
FIG. 15 is a perspective view of the fastening device illustrated in FIG. 9 while the fastening device is in the unlocked position prior to insertion of the male component into the female component.
Figure 16:
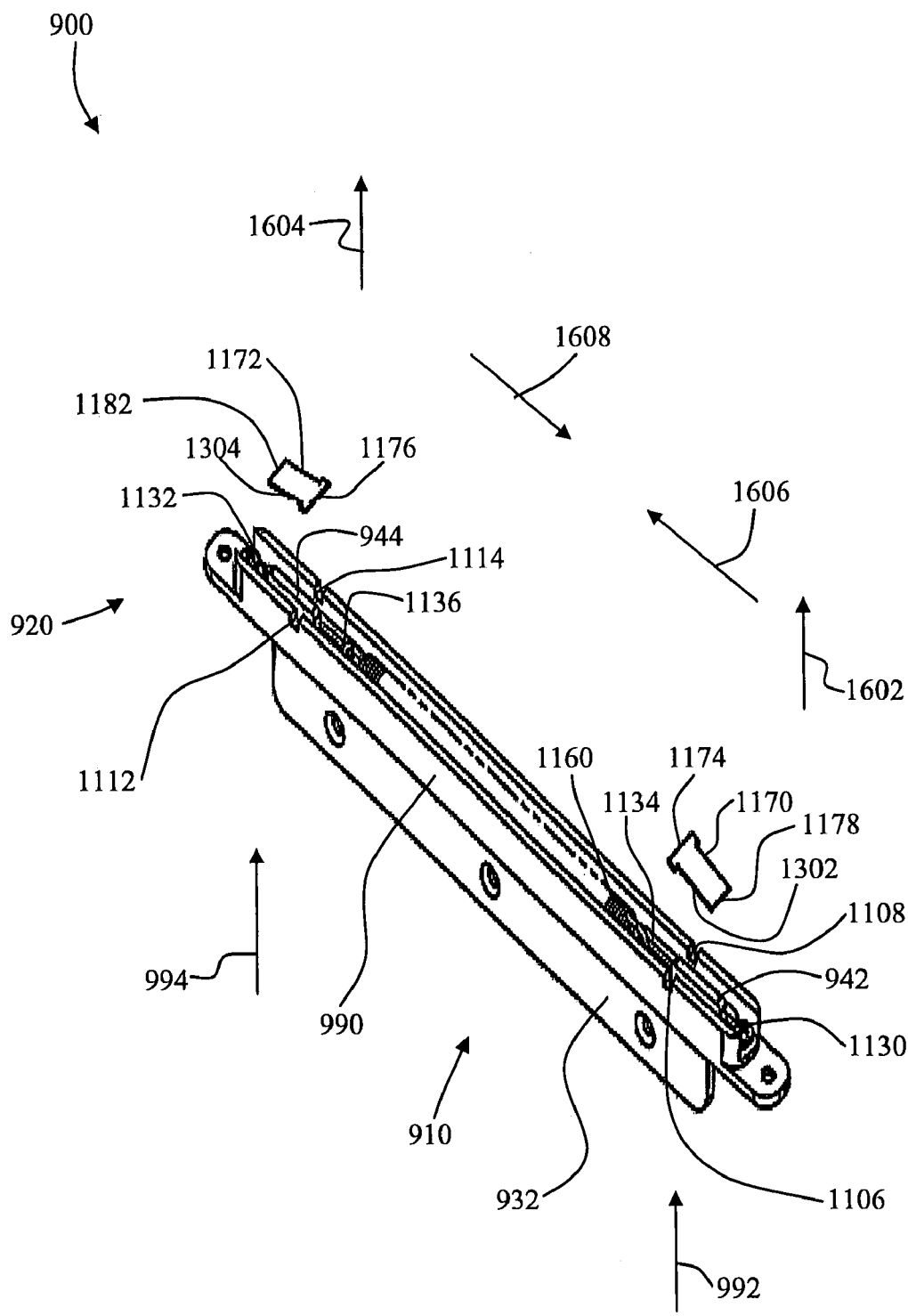
FIG. 16 is a perspective view of the fastening device illustrated in FIG. 9 after the male component has been inserted into the female component and the female component has been moved to a locked position.
Figure 17:
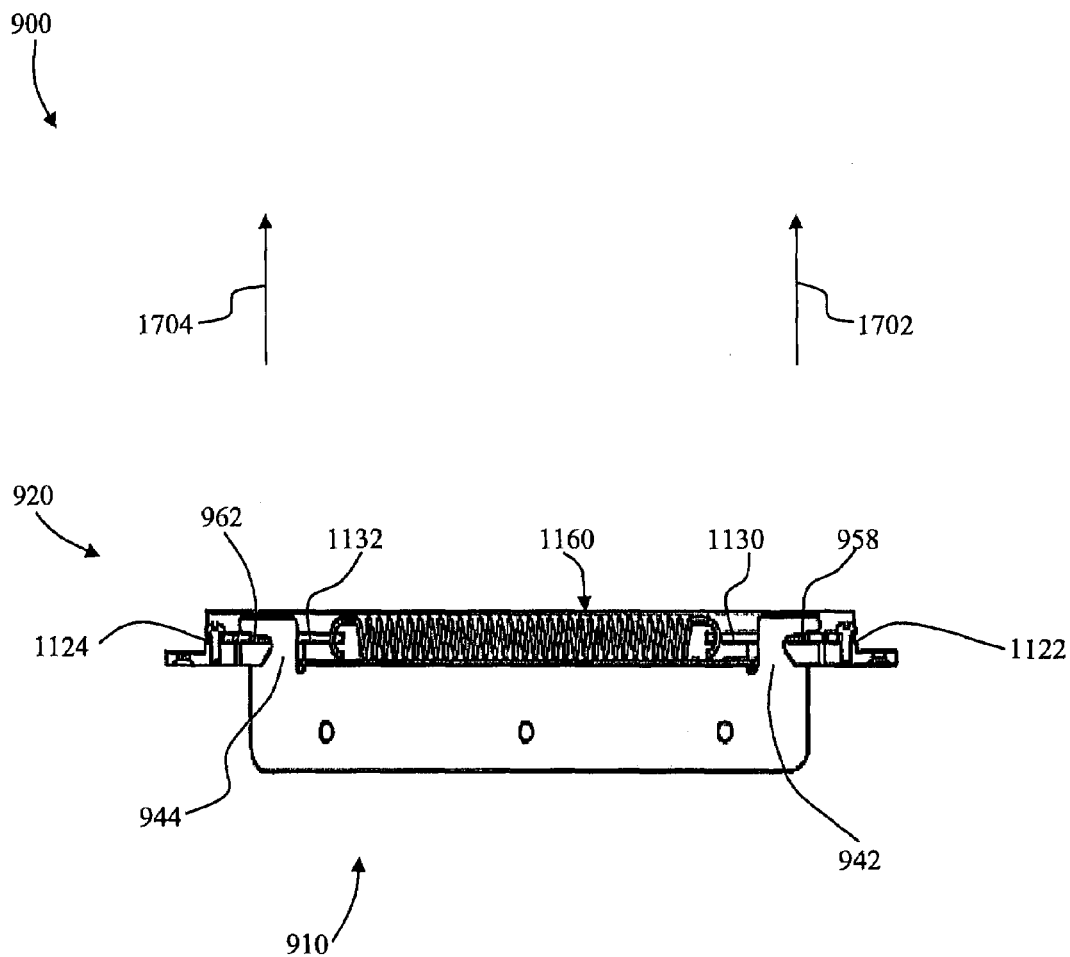
FIG. 17 is a cross-sectional elevation view of the fastening device in the locked position.

The operation of fastening device 900 and the interaction of its various features will now be described with reference primarily to FIGS. 15-17. Generally, FIGS. 15 and 16 illustrate a sequence of events that may occur in the process of securely fastening male component 910 of fastening device 900 to female component 920 and thus, in some implementations, securely fastening together two structures with which male component 910 and female component 920 are respectively associated (e.g., first structure 1010 and second structure 1020 illustrated in FIG. 10). FIG. 17 is a cross-sectional view of fastening device 900 while in the locked state and may be compared with FIG. 13, which is a cross-sectional view of fastening device 900 while in the unlocked state.

FIG. 15 illustrates fastening device 900 in an unfastened state, i.e., prior to insertion of male component 910 into female component 920. Locking mechanisms 1130 and 1132 of female component 920 are positioned in the unlocked position. At the unlocked position, second inlet apertures 1134 and 1136 of locking mechanisms 1130 and 1132 are aligned with respective first inlet apertures 972 and 974 (see, e.g., FIG. 12) of housing 990. Contact surfaces 1302 and 1304 (FIG. 13) of retaining members 1170 and 1172 are located at least partially above respective second inlet apertures 1134 and 1136, such that contact surfaces 1302 and 1304 at least partially obstruct the respective paths of protrusions 942 and 944 of male component 910 along directions of insertion 992 and 994. As described above, biasing element 1160 is interfaced between structural features of housing 990 and locking mechanisms 1130 and 1132 in such a manner that biasing element 1160 imparts respective forces on locking mechanisms 1130 and 1132 in resultant linear directions toward the central area of female component 920, as indicated generally by arrows 1502 and 1504. However, in the unlocked position illustrated in FIG. 15, retaining members 1170 and 1172 hold respective locking mechanisms 1130 and 1132 in their unlocked position against the biasing forces of biasing element 1160 as described above. Consequently, potential energy is stored in biasing element 1160 while fastening device is in the unfastened state, i.e., while male component 910 is separated from female component 920.

FIG. 16 illustrates fastening device 900 after insertion of male component 910 into female component 920. Protrusions 942 and 944 of male component 910 have been moved far enough along directions of insertion 992 and 994 so as to pass through respective first inlet apertures 972 and 974 (see, e.g., FIG. 12) of housing 990 and second inlet apertures 1134 and 1136 of locking mechanisms 1130 and 1132. The manner by which male component 910 is inserted into female component 920 depends on the operating environment in which fastening device 900 is being implemented. For instance, in a case where male component 910 is attached to or integrated with first structure 1010 (FIG. 10) and female component 920 is attached to or integrated with second structure 1020 (e.g., where first structure 1010 and second structure 1020 are furniture parts to be assembled together), first structure 1010 may be aligned with second structure 1020 so that protrusions 942 and 944 are aligned with respective first inlet apertures 972 and 974 and then first structure 1010 moved toward second structure 1020, second structure 1020 moved toward first structure 1010, or first structure 1010 and second structure 1020 moved simultaneously toward each other.

As protrusions 942 and 944 enter female component 920 via first inlet apertures 972 and 974 and second inlet apertures 1134 and 1136, protrusions 942 and 944 eventually come into contact with respective contact surfaces 1302 and 1304 (FIG. 13) of retaining members 1170 and 1172 and impart forces on retaining members 1170 and 1172. As a result, protrusions 942 and 944 cause respective retaining members 1170 and 1172 to be disengaged from female component 920 such that first retaining member ends 1174 and 1176 respectively move out from first notches 1106, 1108, 1112, and 1114 of housing 990 and second retaining member ends 1178 and 1182 respectively move out from second notches 1138, 1142, 1144, and 1146 of locking mechanisms 1130 and 1132, as indicated generally by arrows 1602 and 1604. At this point in time, retaining members 1170 and 1172 no longer constrain the movement of locking mechanisms 1130 and 1132, and locking mechanisms 1130 and 1132 are translated into the locked position in the directions generally indicated by arrows 1606 and 1608 under the biasing force provided by biasing element 1160. As appreciated by persons skilled in the art, the potential energy stored by biasing element 1160 is converted to kinetic energy to cause locking mechanisms 1130 and 1132 to be translated into the locked position, and biasing element 1160 relaxes to its released-energy state. The locked position illustrated in FIG. 16 corresponds to a state of fastening device 900 at which male component 910 and female component 920 (and any structural components with which male component 910 and female component 920 are respectively associated) are fully secured to each other and male component 910 cannot be removed from female component 920.

FIG. 17 is a cross-sectional view of fastening device 900 while in the locked state. In implementations in which inner edges 958 and 962 of protrusions 942 and 944 of male component 910 are ramped, protrusions 942 and 944 may serve as cams. Once protrusions 942 and 944 have pushed retaining members 1170 and 1172 (FIG. 16) out of engagement with female component 920, locking mechanisms 1130 and 1132 are pulled by biasing element 1160 around respective tips 948 and 952 of protrusions 942 and 944 and into contact with ramped inner edges 958 and 962. As locking mechanisms 1130 and 1132 are pulled toward each other, locking mechanisms 1130 and 1132 impart respective forces on ramped inner edges 958 and 962. As a result, due to inner edges 958 and 962 being angled relative to the direction along which locking mechanisms 1130 and 1132 move, locking mechanisms 1130 and 1132 cause protrusions 942 and 944 to be moved upwardly as indicated generally by arrows 1702 and 1704. That is, locking mechanisms 1130 and 1132 cause male component 910 to be drawn further into female component 920. The biasing force provided by biasing element 1160 is strong enough to facilitate this self-tightening action.

FIGS. 18-24 illustrate an example of one alternative embodiment of a fastening device having a securing device 1860, also known as an edge cam, capable of securing the fastening device 1800 in a first structure 1815 without the necessity of screws, bolts or other similar fasteners.

Figure 18:
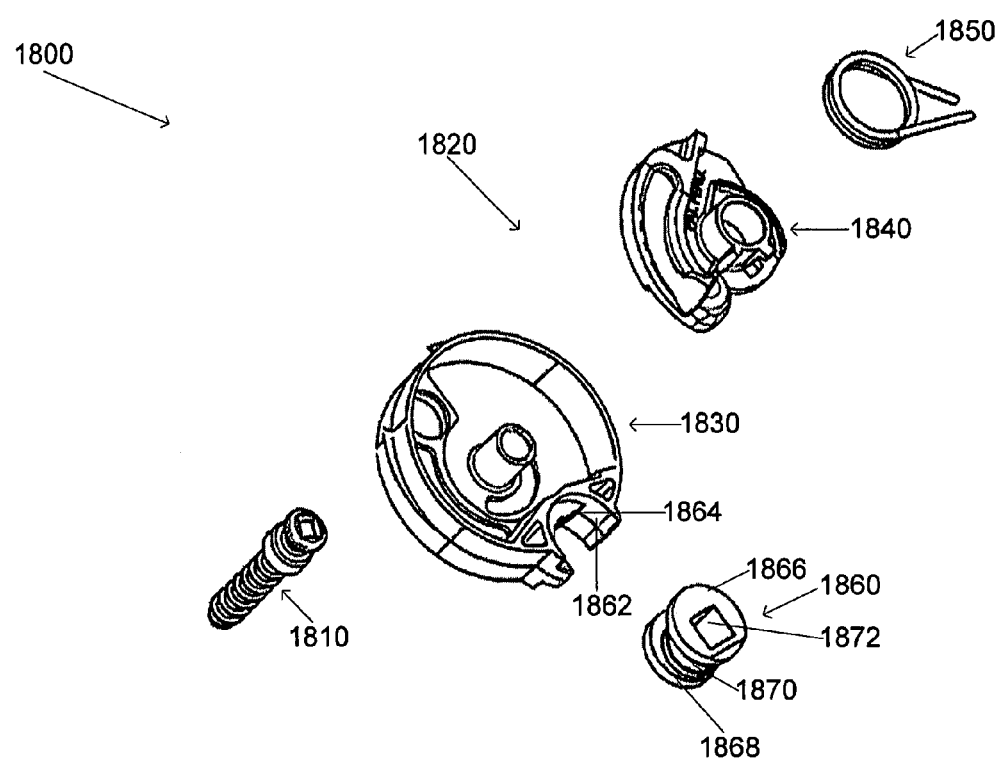
FIG. 18 is an exploded rear view of another example of an embodiment of a fastening device utilizing an edge cam to secure the fastening device in a structure.
Figure 19:
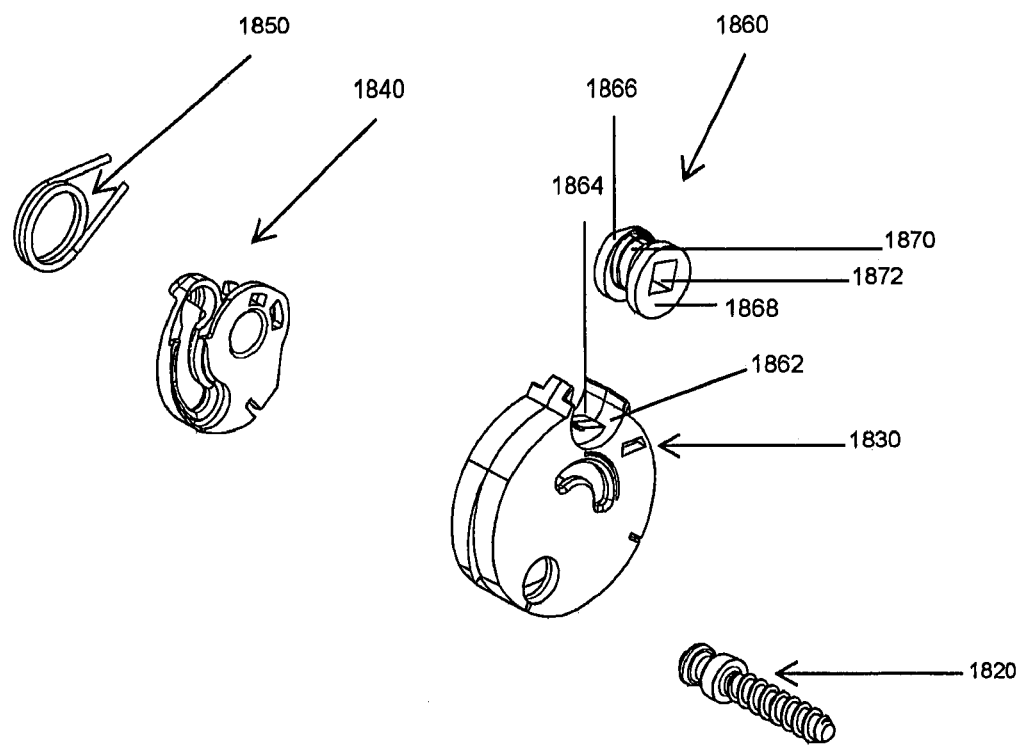
FIG. 19 is an exploded top view of another example of an embodiment of the fastening device illustrated in FIG. 18.

FIGS. 18 & 19 illustrate opposing exploded views of another example of an embodiment of a fastening device 1800 utilizing an edge cam 1860 to secure the fastening device in a structure (see FIGS. 20-24). In this example embodiment, the fastening device 1800 includes a male component 1810 and a female component 1820, the female component 1820 having a housing 1830, movable component 1840 and an energy storing mechanism 1850. The illustrated fastening device 1800 is similar to the example of the fastening device illustrated in FIGS. 1-8, except that the female component 1840 includes a recessed portion 1864 on one side of the housing 1830 for receiving an edge cam 1860. The recessed portion 1864 having a compression edge 1864 protruding therefrom for placing compressive force against the edge cam 1860. As further illustrated in FIGS. 18-24, the housing 1832 may be designed without any incline, whereby the locking mechanism 1840 is the only component that includes an incline for retracting the male component 1810 into the female component 1820.

The edge cam 1860 has a top portion 1866 a bottom portion 1868 and a middle offset portion 1870 that is positioned between the top portion 1866 and the bottom portion 1868 and is offset to one side of the edge cam 1860. The edge cam 1860 further includes a bore 1872 for receiving a tool capable of rotating the edge cam 1860.

When the female component 1800 is positioned within a structure 1815, as illustrated in FIGS. 20-24, the edge cam 1860 can retain the female component 1800 within the structure 1815. The edge cam 1860 may be easily positioned within the recess 1864 of the housing 1840 of the female component 1800 positioned within the structure when the middle portion is positioned so that it is offset toward the outside of the female component 1800. Once positioned, the edge cam 1860 can be rotated so that the offset portion is positioned toward the interior of the female component 1800. When rotated, the compression edge 1864 will apply compressive force against the middle portion 1870 of the edge cam 1860. Through this compressive force, a friction fit is created that maintains the female component 1840 within the opening for receiving the fastening device in the first structure.

Figure 20:
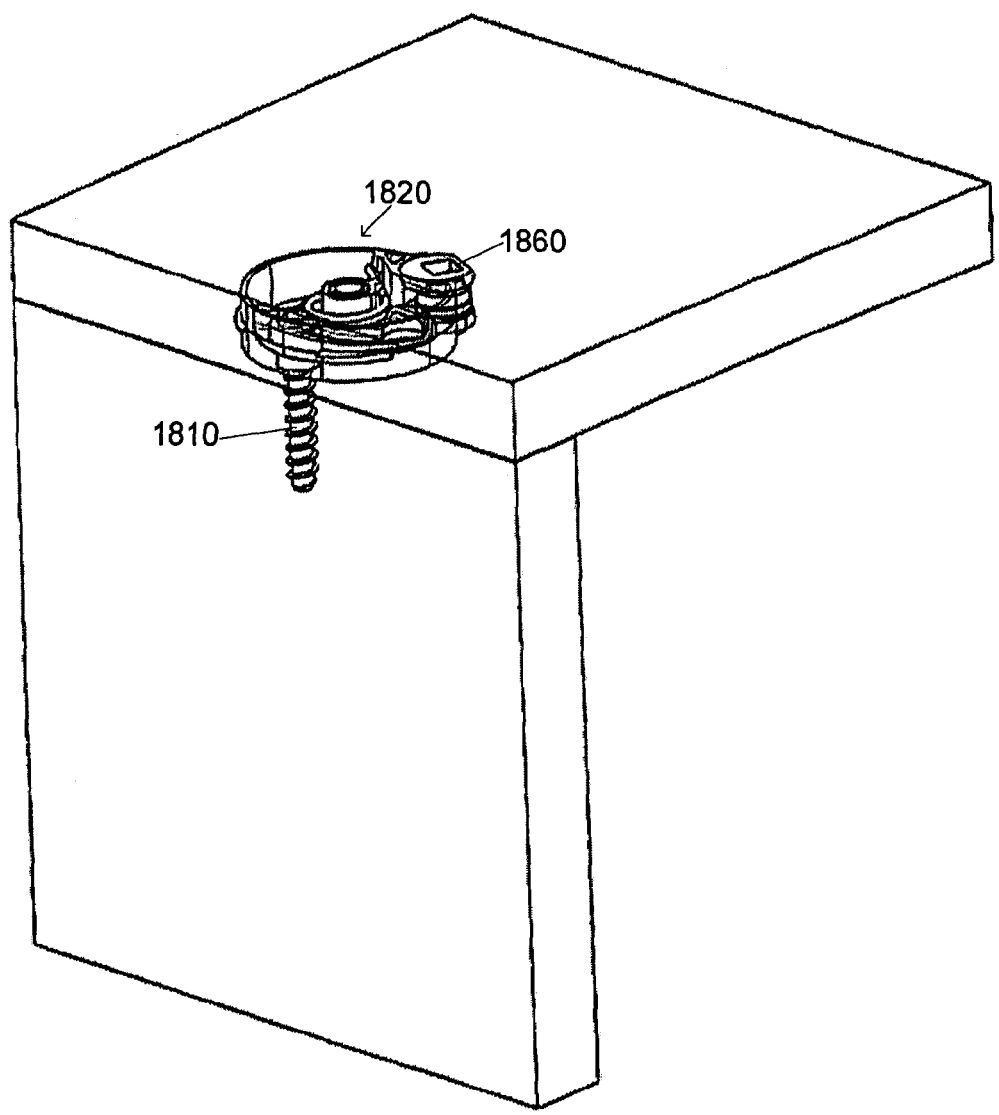
FIG. 20 is a perspective view of the fastening device illustrated in FIG. 18 integrated with respective structures and illustrating the fastening device as it would appear after the male component has been inserted into the female component and the female component has been moved to a locked position.
Figure 21:
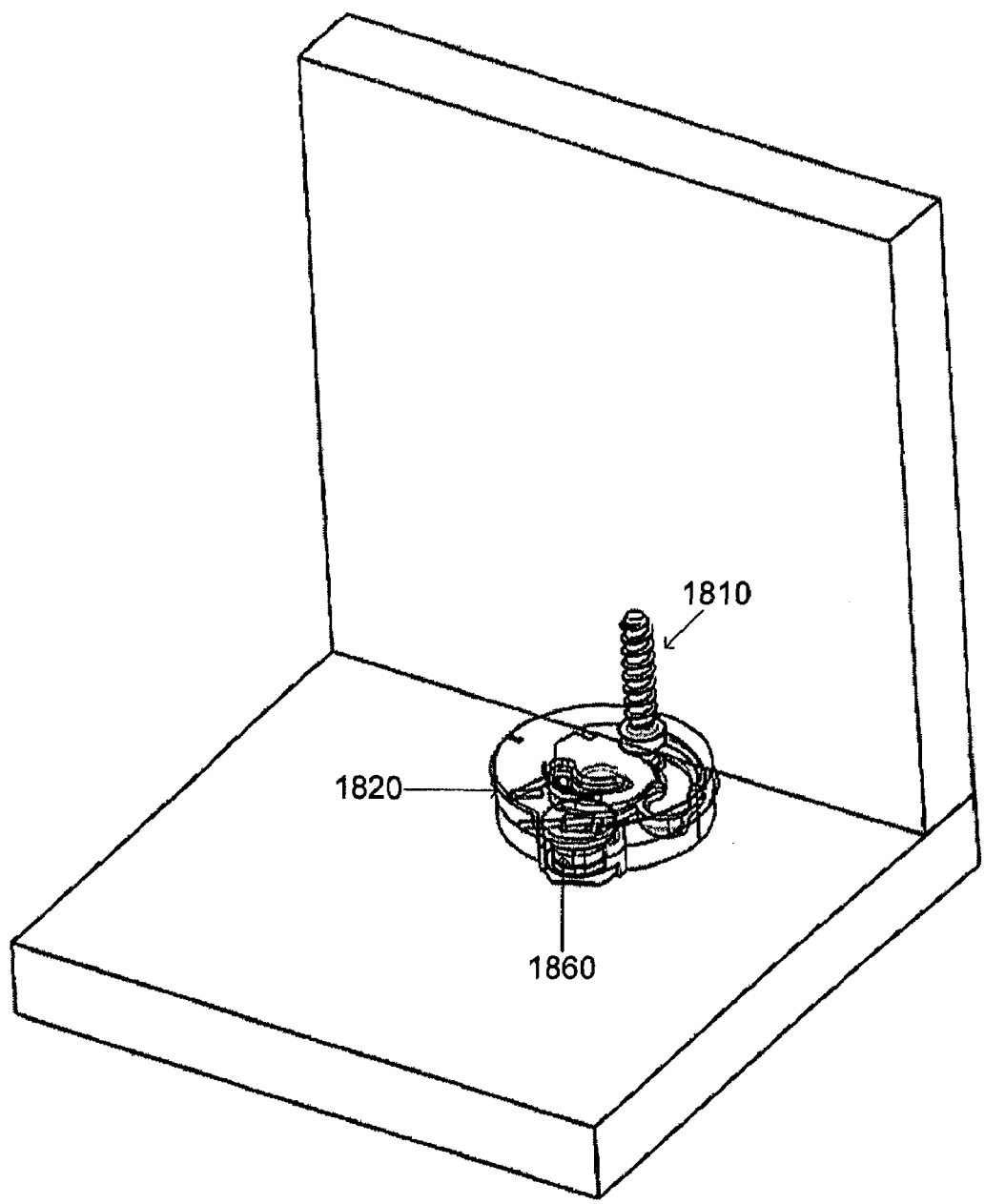
FIG. 21 is a perspective view of the fastening device illustrating the opposing perspective view shown in FIG. 20.
Figure 22:
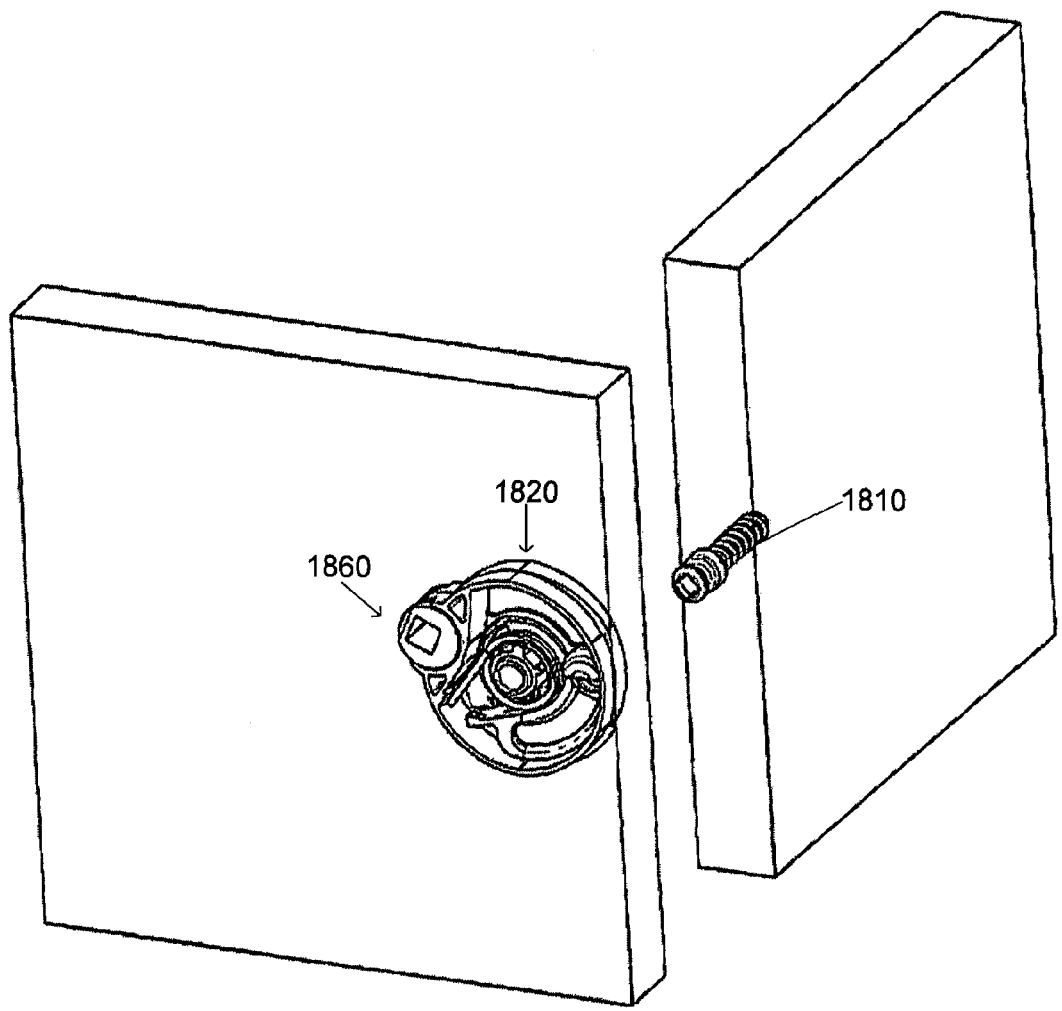
FIG. 22 is a plan view of the fastening device illustrated in FIG. 18 integrated with respective structures and illustrating the female component in the locked position absent the male component being inserted into the female component.
Figure 23:
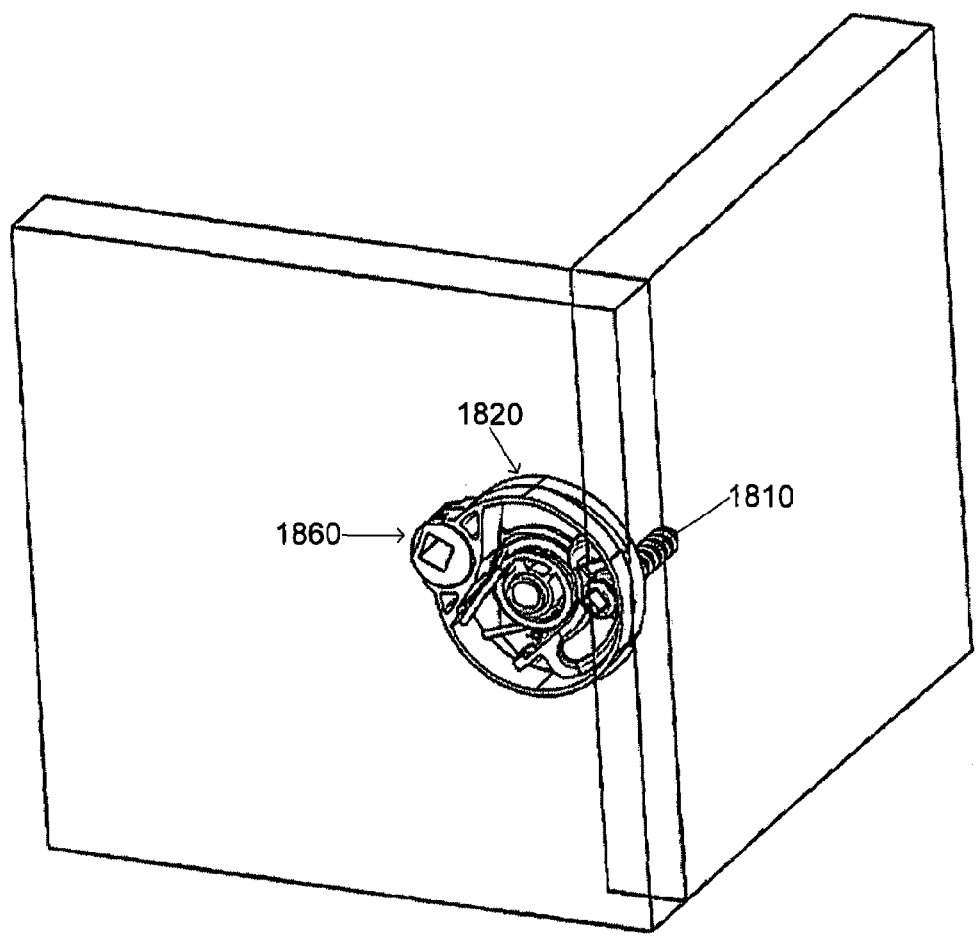
FIG. 23 is a plan view of the fastening device illustrated in FIG. 18 integrated with respective structures and illustrating the female component in the unlocked position with the male component inserted into the female component.
Figure 24:
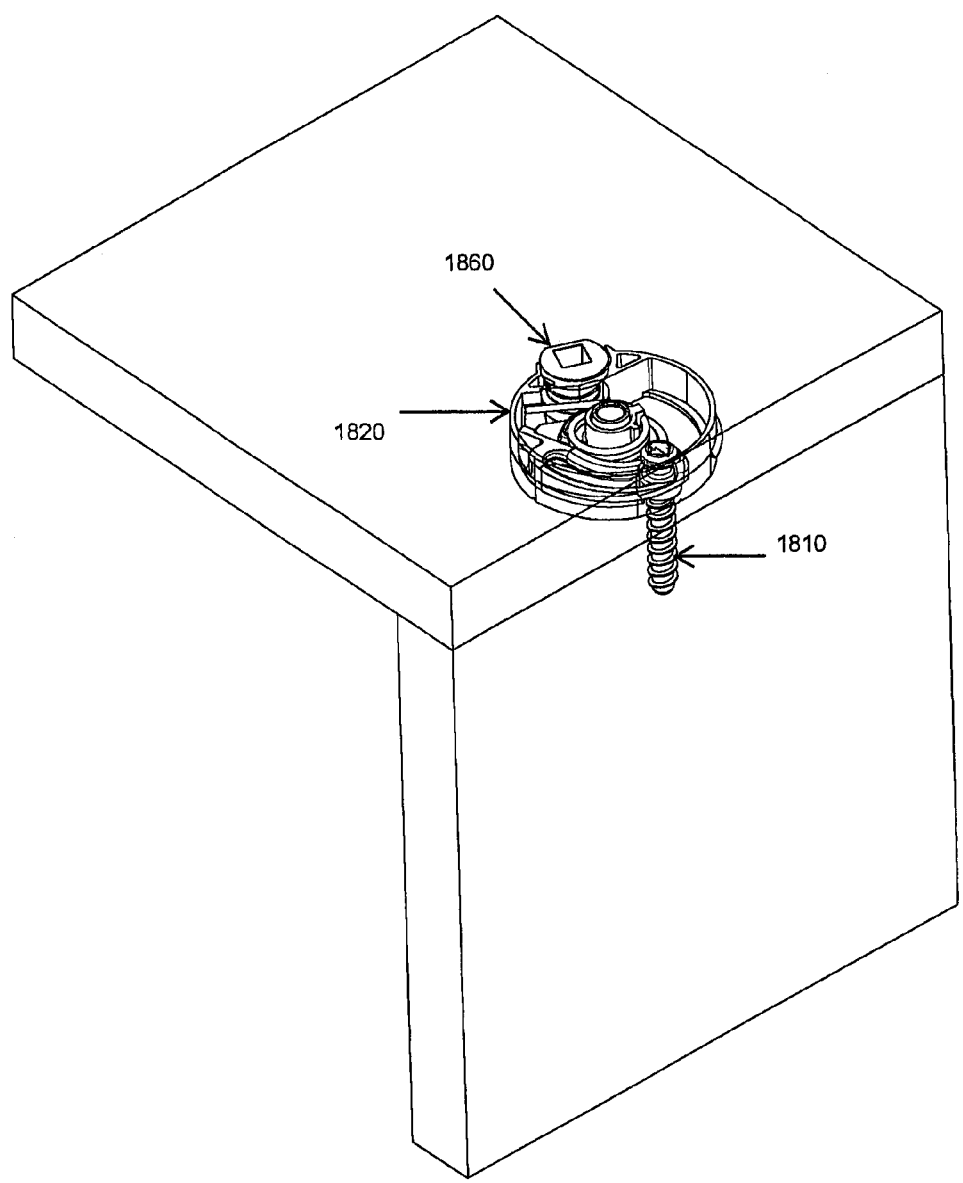
FIG. 24 is a perspective view of the fastening device illustrated in FIG. 18 integrated with respective structures and illustrating the female component in the locked position with the male component inserted into the female component.

FIG. 20 is a perspective view of the fastening device illustrated in FIG. 18 integrated with respective structures and illustrating the fastening device as it would appear after the male component has been inserted into the female component and the female component has been moved to a locked position. FIG. 21 is a perspective view of the fastening device illustrating the opposing perspective view shown in FIG. 20. FIG. 22 is a plan view of the fastening device illustrated in FIG. 18 integrated with respective structures and illustrating the female component in the locked position absent the male component being inserted into the female component. FIG. 23 is a plan view of the fastening device illustrated in FIG. 18 integrated with respective structures and illustrating the female component in the unlocked position with the male component inserted into the female component. FIG. 24 is a perspective view of the fastening device illustrated in FIG. 18 integrated with respective structures and illustrating the female component in the locked position with the male component inserted into the female component.

FIGS. 25-35 illustrate another example of an alternative embodiment of a fastening device 2500 designed to secure members together in a single plane rather in a perpendicular plane.

Figure 25:
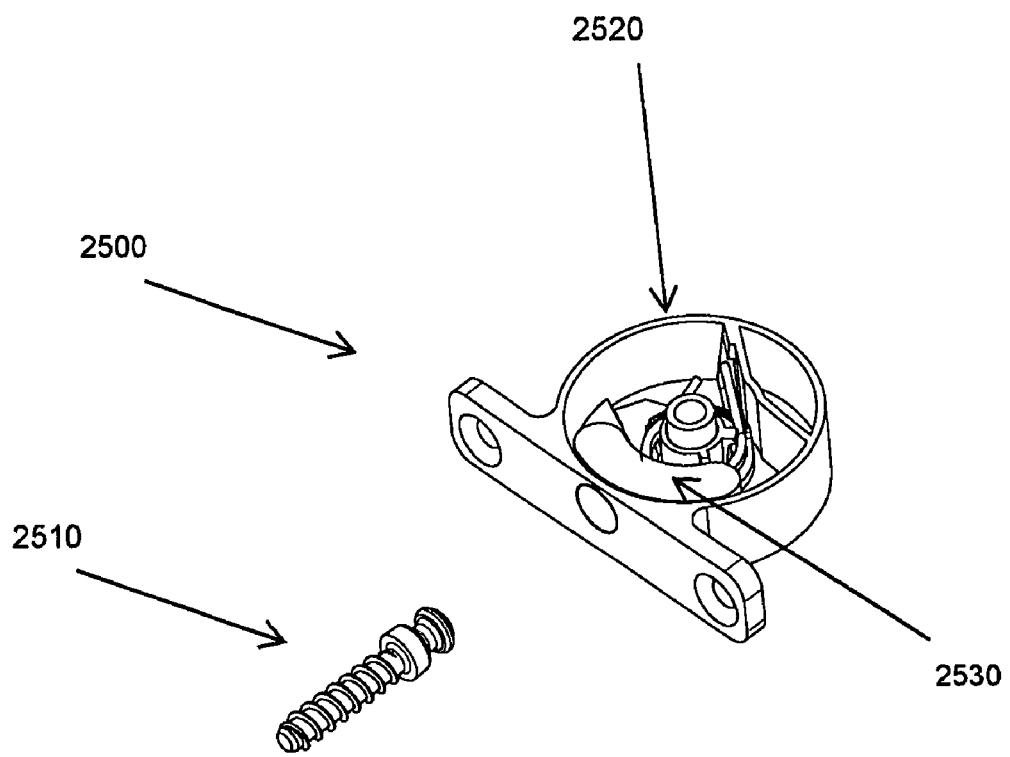
FIG. 25 is a perspective view of another embodiment of a fastening device capable of securing two structures in the same plane.

FIG. 25 is a perspective view of this example fastening device 2500 capable of securing two structures in the same plane. As illustrated in FIG. 25, the fastening device 2500 includes a male component 2510 and a female component 2520. In this example, the locking mechanism 2530 of the female component 2520 receives the male component 2510 from an opening in the side, rather than the bottom, of the female component 2520. In this example, the female component 2520 engages the male component 2510 from the side to enable the device to secure two structures in the same plane.

The locking component 2530 pulls the male component 2510 into the female component 2520 in the same manner as the above illustrated examples—through the use of an incline design on the locking mechanism 2530.

Figure 26:
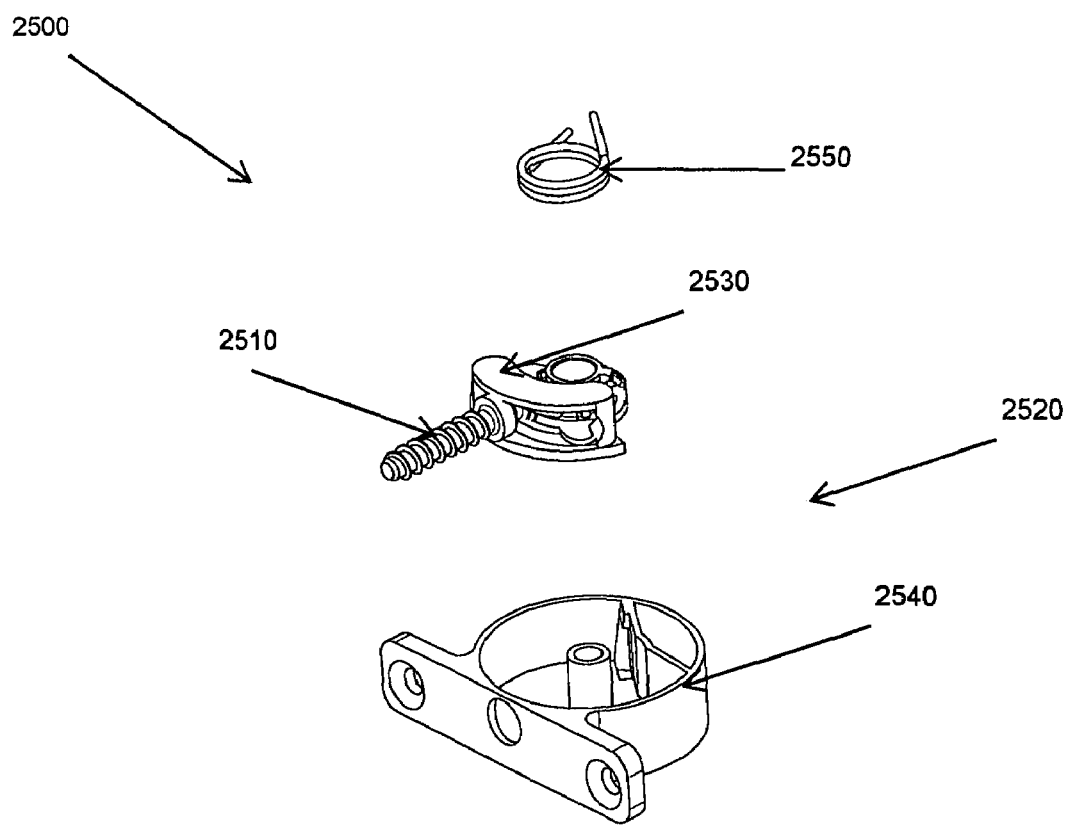
FIG. 26 is an exploded perspective view of the fastening device illustrated in FIG. 25 illustrating the fastening device in the unlocked position.
Figure 27:
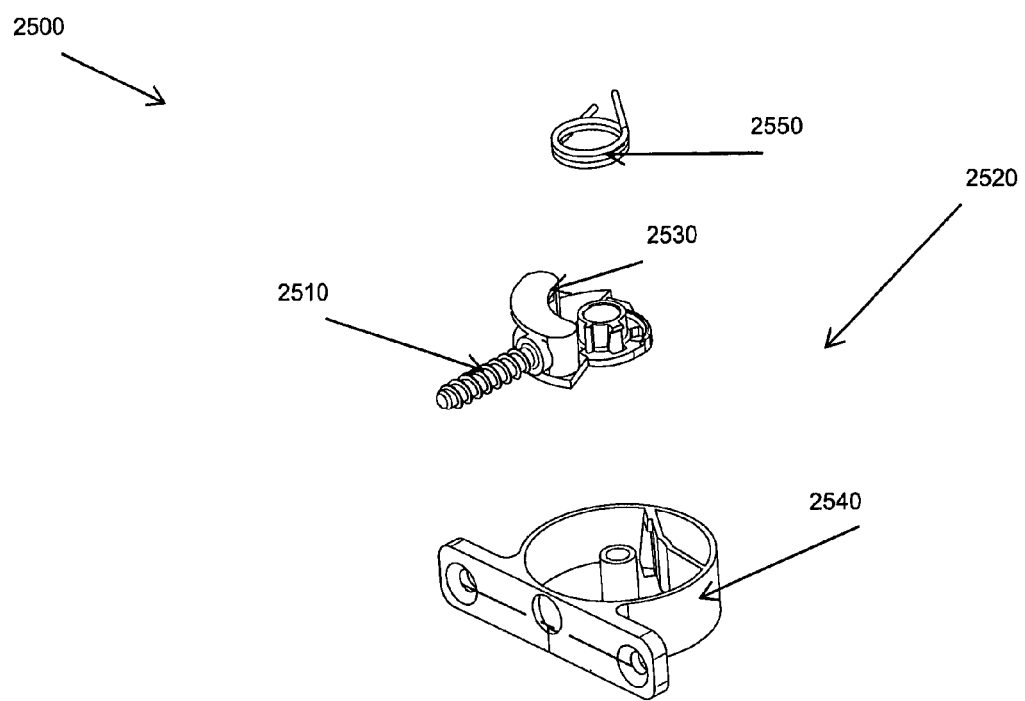
FIG. 27 is an exploded perspective view of the fastening device illustrated in FIG. 25 illustrating the fastening device in the locked position.

FIG. 26 is an exploded perspective view of the fastening device 2500 of FIG. 25 illustrating the fastening device 2500 in the unlocked position and FIG. 27 shows the fastening device 2500 in the locked position, both only with the male component 2510 positioned within the locking mechanism 2530 of the female component 2520. As illustrated in FIGS. 26 & 27, the female component 2520 may include a biasing mechanism 2550 and housing 2540, as well as the locking mechanism 2530, similar to the female components described in the previous embodiments.

Figure 28:
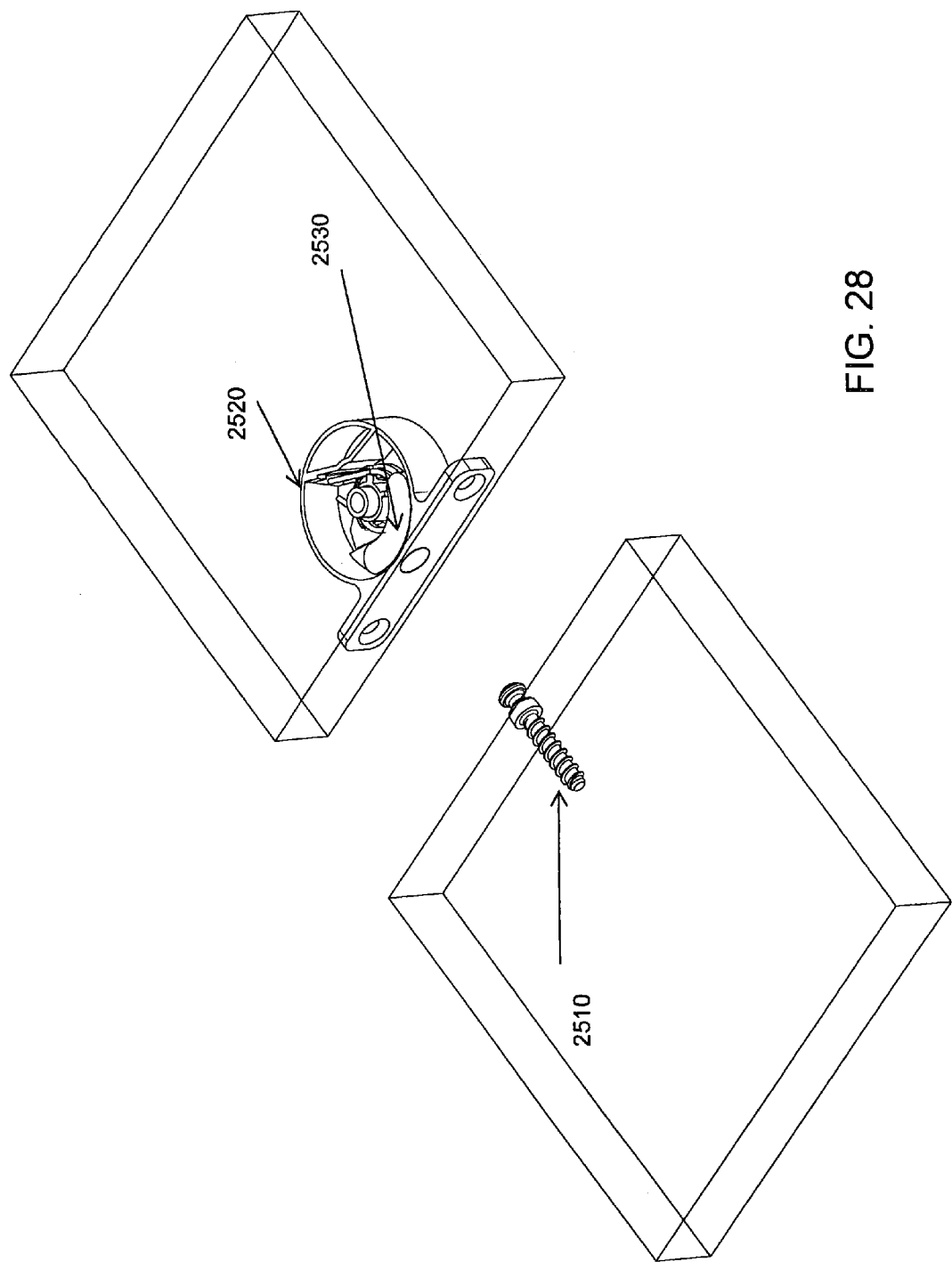
FIG. 28 illustrates the fastening device in FIG. 25 integrated into two structures.
Figure 30:
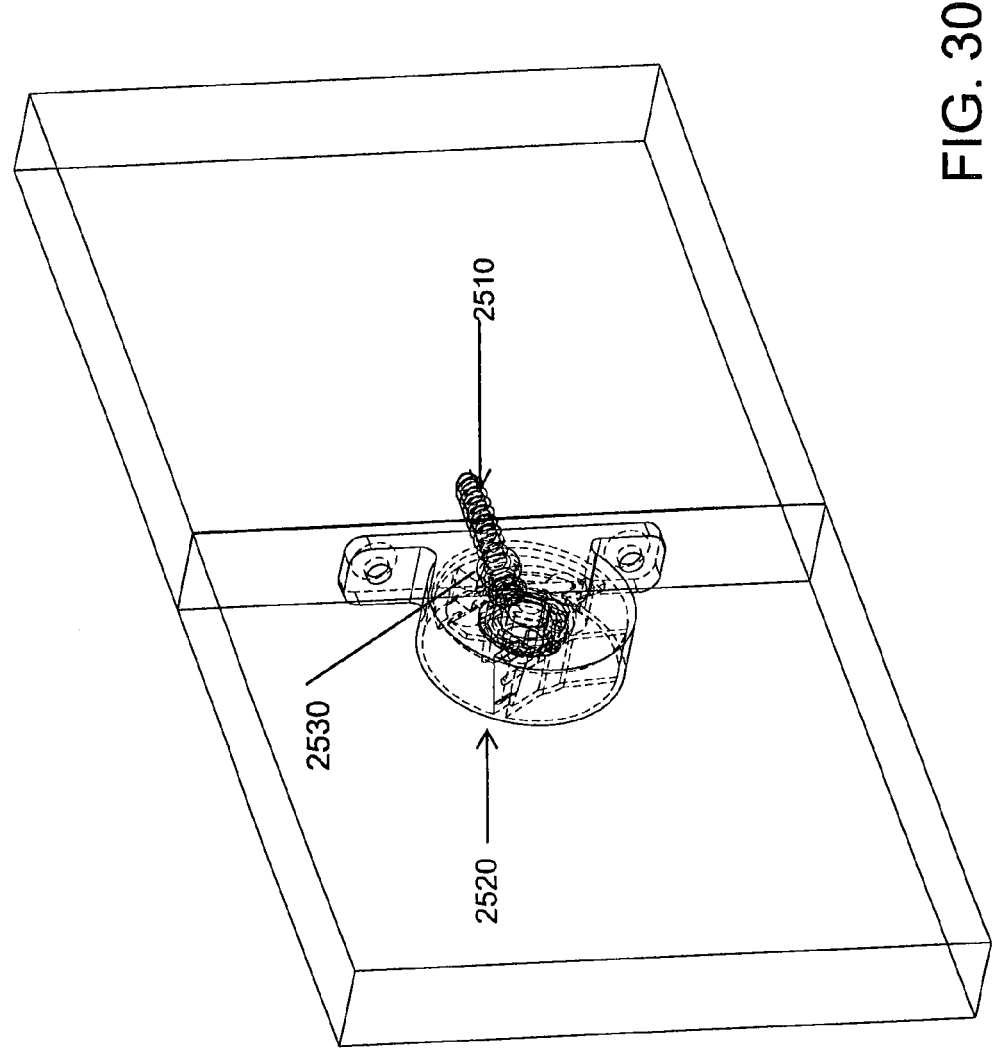
FIG. 30 illustrates a plan view of the fastening device in FIG. 25 integrated into two structures with the male component positioned in the female component.
Figure 31:
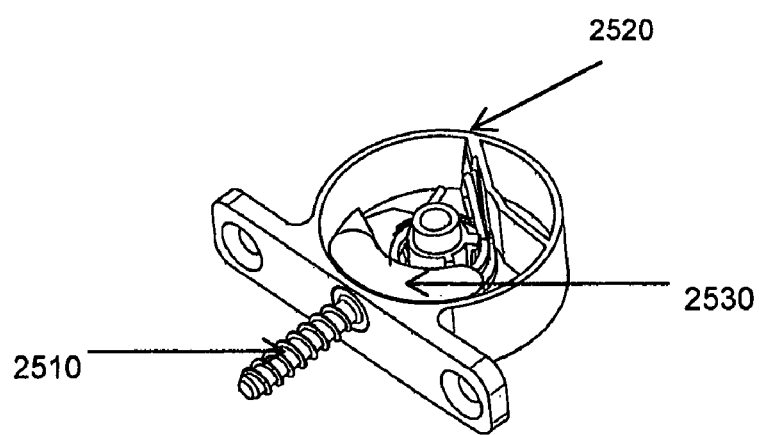
FIG. 31 illustrates a perspective view of the fastening device in FIG. 25 integrated into two structures with the male component positioned in the female component and the fastening device in the locked position.

FIGS. 28 & 29 illustrate the fastening device 2500 integrated into two structures. FIG. 30 illustrates a plan view of the fastening device 2500 in FIG. 25 integrated into two structures with the male component 2510 positioned in the female component 2520. FIG. 31 illustrates a perspective view of the fastening device 2500 in FIG. 25 integrated into two structures with the male component 2510 positioned in the female component 2520 and the fastening device 2500 in the locked position.

Figure 32:
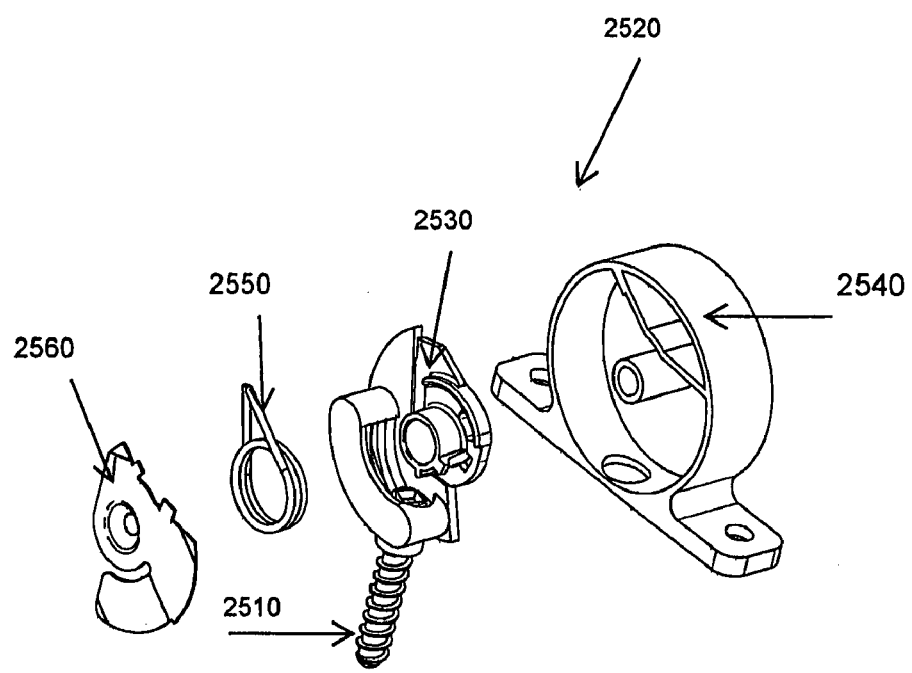
FIG. 32 illustrates an exploded perspective view of the fastening device illustrated in FIG. 25 with the male component positioned in the locking mechanism of the female component with the locking mechanism positioned in the unlocked position.
Figure 33:
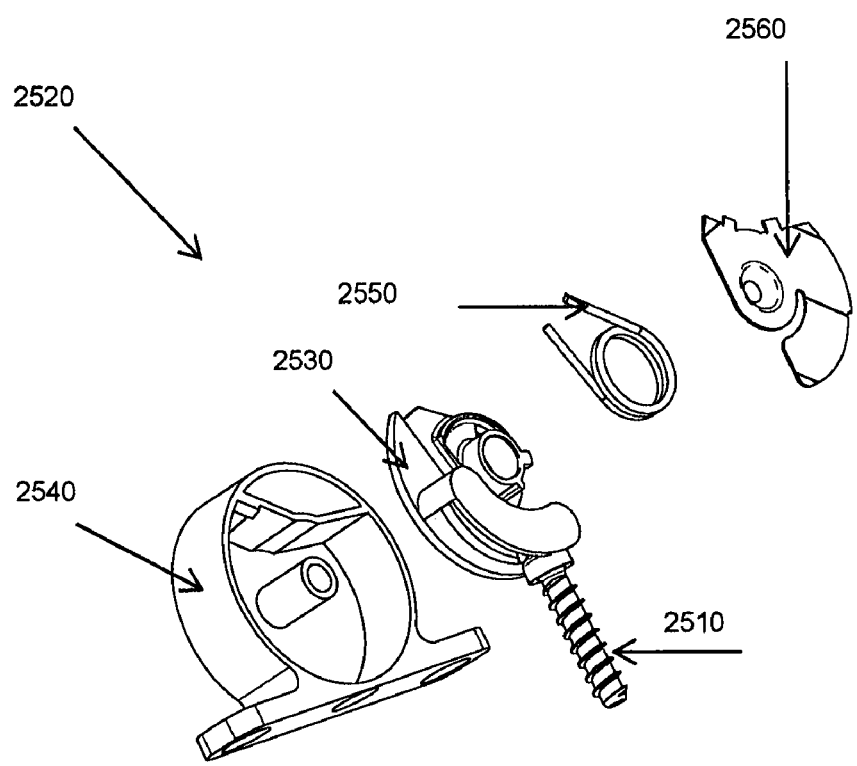
FIG. 33 illustrates an opposing exploded perspective view of the fastening device illustrated in FIG. 32.
Figure 34:
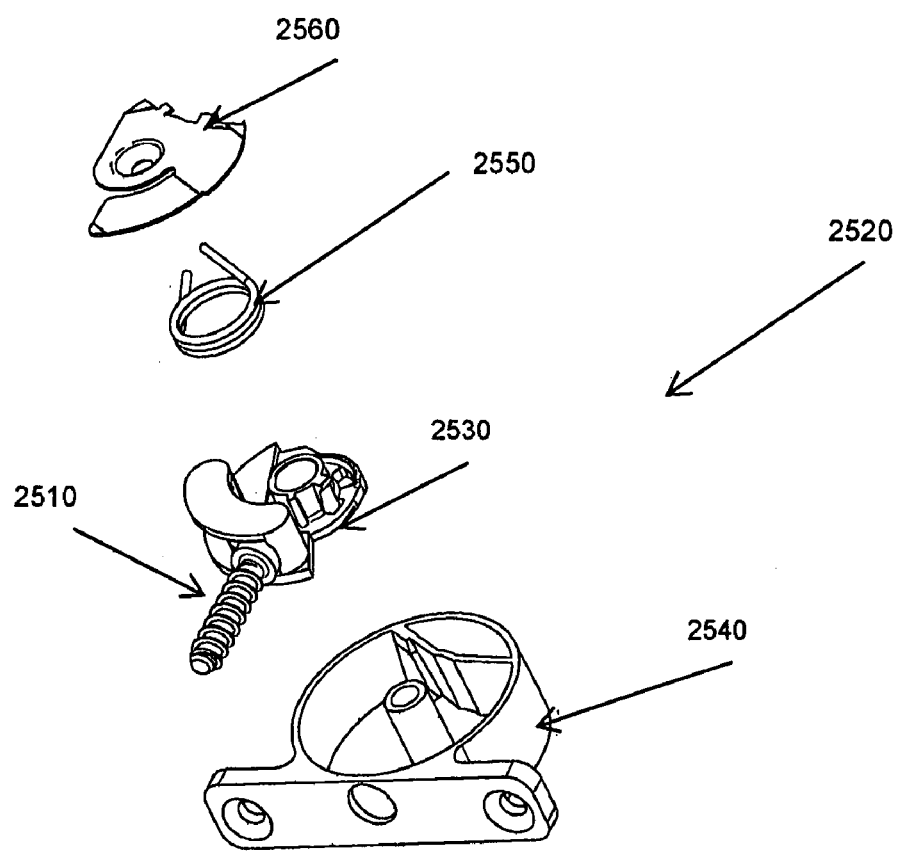
FIG. 34 illustrates an exploded perspective view of the fastening device illustrated in FIG. 32 with the male component positioned in the locking mechanism of the female component with the locking mechanism positioned in the locked position.
Figure 35:
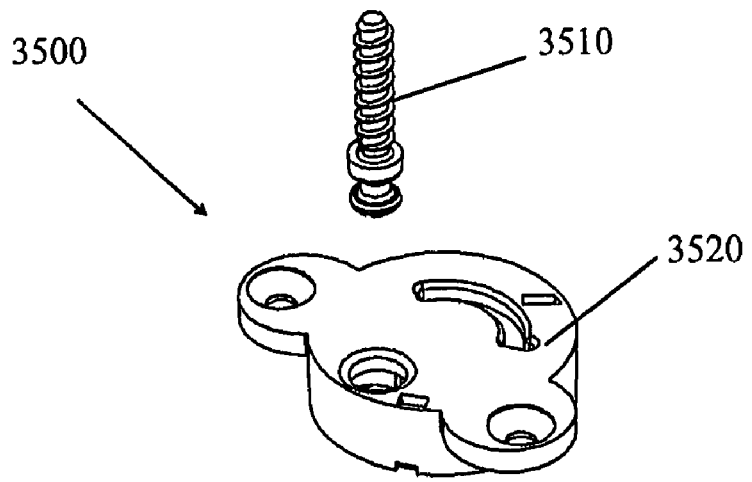
FIG. 35 illustrates a top perspective view of another example of an implementation of a fastening device designed to receive a locking key and a lock-out pin.
Figure 36:
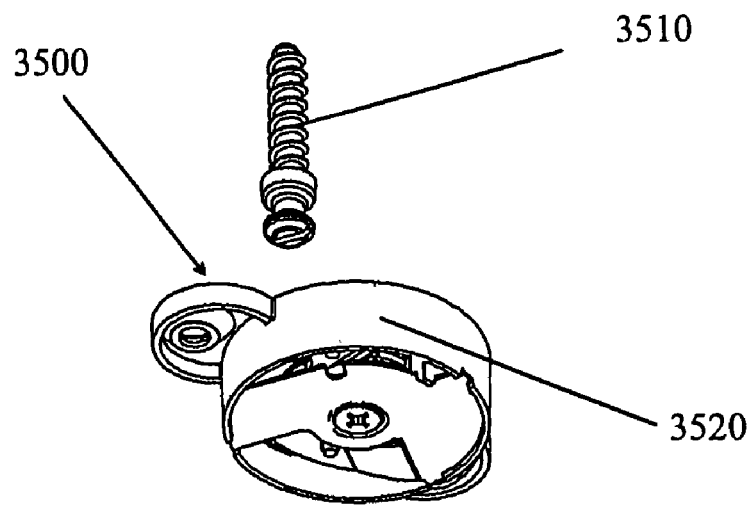
FIG. 36 illustrates a bottom perspective view of the fastening device in FIG. 35.
Figure 37:
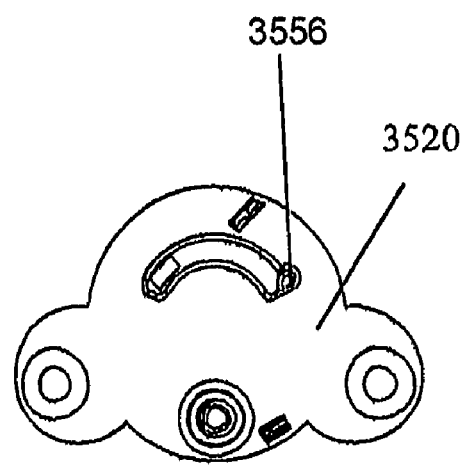
FIG. 37 illustrates a top plan view of the fastening device in FIG. 35.
Figures 38, 39:
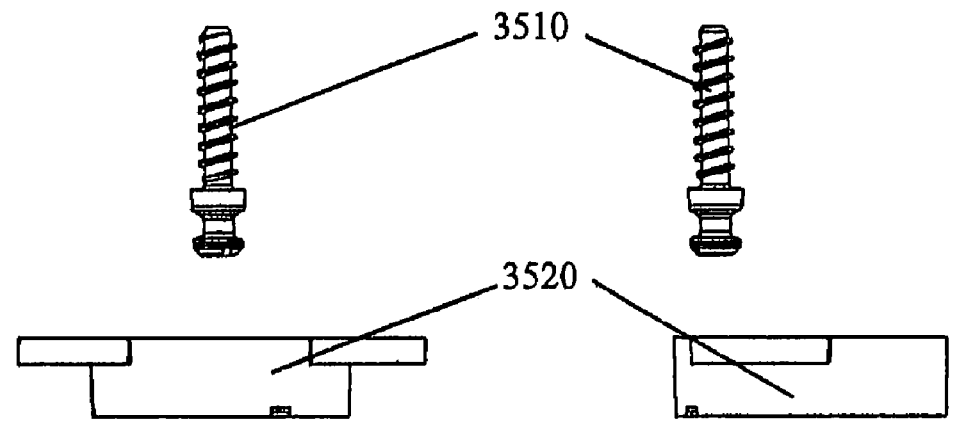
FIG. 38 illustrates a front view of the fastening device in FIG. 35.
FIG. 39 illustrates a side view of the fastening device in FIG. 35.
Figure 40:
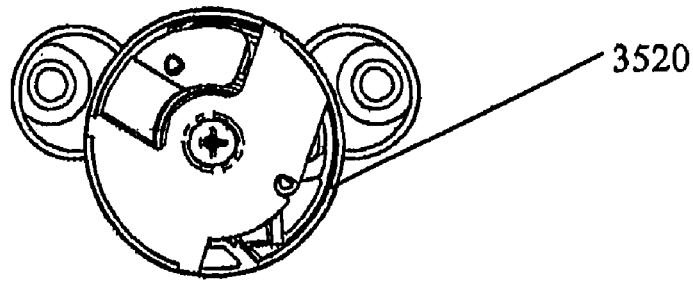
FIG. 40 illustrates an opposing plan view of the fastening device illustrated in FIG. 37.
Figures 41, 43:
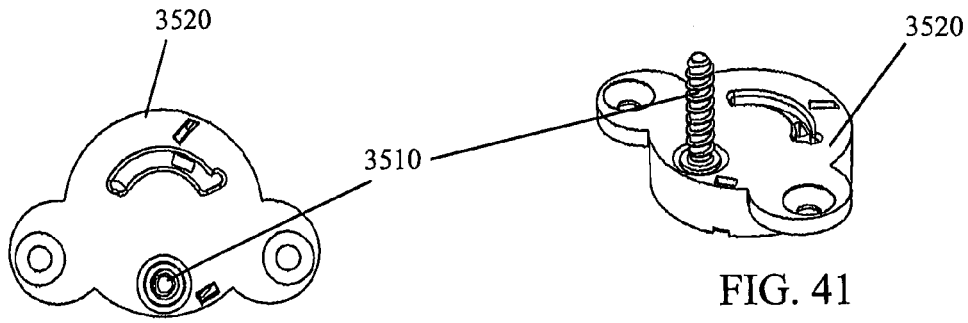
FIG. 41 illustrates a top perspective view of the fastening device illustrated in FIG. 35 having the mail component engaged with the female component.
FIG. 43 illustrates a top plan view of the fastening device in FIG. 41.
Figures 44, 45:
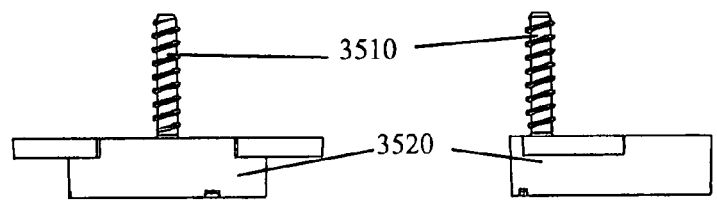
FIG. 44 illustrates a front view of the fastening device in FIG. 41.
FIG. 45 illustrates a side view of the fastening device in FIG. 41.
Figures 42, 46:
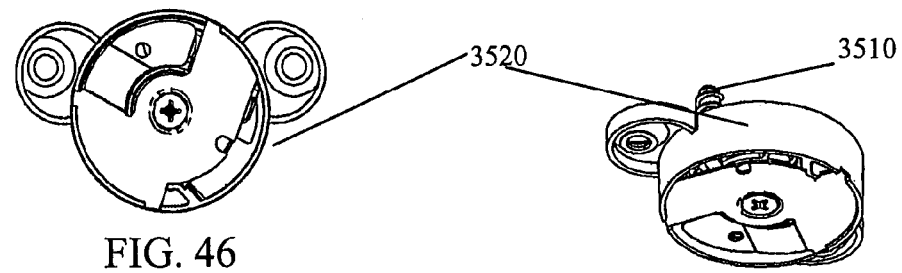
FIG. 42 illustrates a bottom perspective view of the fastening device in FIG. 41.
FIG. 46 illustrates an opposing plan view of the fastening device in FIG. 43.

FIG. 32 illustrates an exploded perspective view of the fastening device 2500 illustrated in FIG. 25 with the male component 2510 positioned in the locking mechanism 2530 of the female component 2520 with the locking mechanism 2530 positioned in the unlocked position. FIG. 33 illustrates an opposing exploded perspective view of the fastening device 2500 illustrated in FIG. 32. FIG. 34 illustrates an exploded perspective view of the fastening device 2500 illustrated in FIG. 32 with the male component 2510 positioned in the locking mechanism 2530 of the female component 2520 with the locking mechanism 2530 positioned in the locked position.

FIGS. 35-72 illustrate another example of an alternative embodiment of a fastening device 3500 that includes a locking key 3550 for releasing the lock 3560 from the locked position and a lock-out pin 3570 to maintain the fastening device 3500 in the open position. In this example, a cover spring 3540 may be used to hold the locking mechanism 3530 in the open position, similar to the functions shown in the above embodiments. A locking key 3550 having a releasing pin 3555 may be inserted into the fastening device 3500 that pushes the cover 3540 spring away from the locking mechanism 3530, thereby releasing the locking mechanism 3530 cam from the locked position. A lock-out pin 3570 may also be include that when inserted will retain the locking mechanism 3530 in the unlocked position for the removal of the male component 3510 from the female component 3520 of the fastening device 3500. When the fastening device 3500 is used in the assembly of structures, such as furniture, the locking pins 3570 will maintain the fastening devices 3500 in the unlocked position making the structures easier to disassemble. The locking pins 3570 may also be used in the assembly of the structures thereby preventing the premature locking of the fastening devices 3500 until the structure is partially or entirely assembled or until it may be confirmed that the proper parts in a given structure are being correctly mated or matched.

FIGS. 35-40 illustrate a top perspective, bottom perspective, top plan, front view, side view and opposing plan view, respectively of the fastening device 3500 having the male component 3510 not engaged with the female component 3520. In contrast. FIGS. 41-47 illustrate a top perspective, bottom perspective, top plan, front view, side view and opposing plan view, respectively of the fastening device 3500 having the male component 3510 engaged with the female component 3520.

Figure 48:
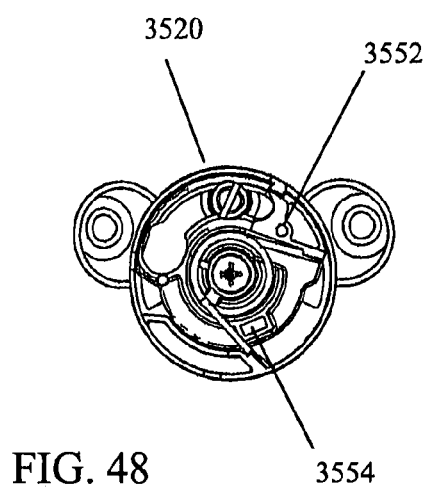
FIG. 48 illustrates a plan view of the female component illustrated in FIG. 47.
Figure 47:
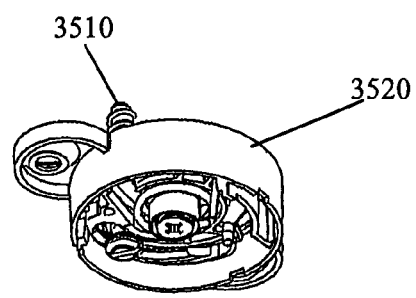
FIG. 47 illustrates a perspective view of the female component of the fastening device in FIG. 35 absent a cover plate on one side.
Figure 63:
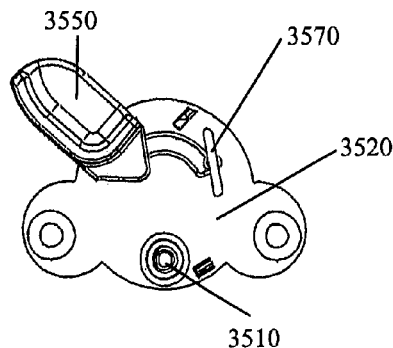
FIG. 63 is a plan view of the fastening device of FIG. 61.
Figure 61:
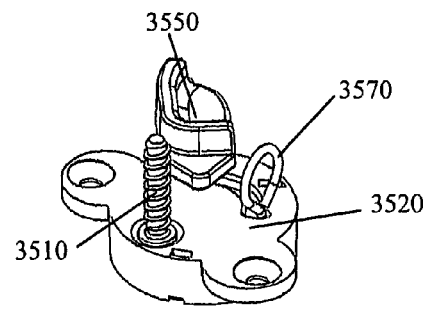
FIG. 61 illustrates a top perspective view of a fastening device illustrating the locking key and the lock-out pin positioned in the fastening device.
Figure 64:
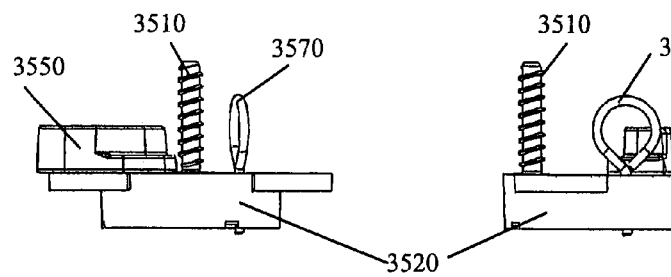
FIG. 64 is a front view of the fastening device of FIG. 61.
Figure 65:
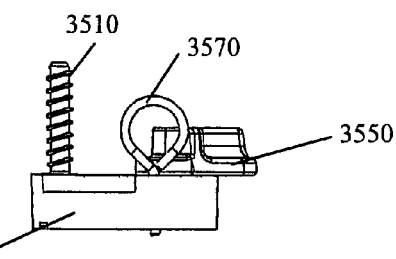
FIG. 65 is a side view of the fastening device of FIG. 61.
Figure 66:
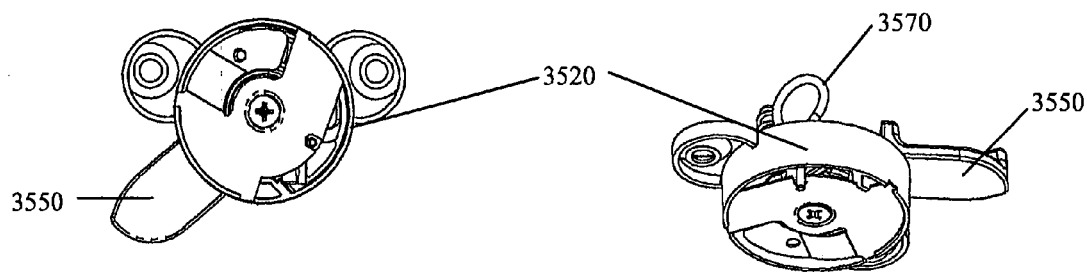
FIG. 66 is an opposing plan view of the fastening device of FIG. 63.
Figure 62:
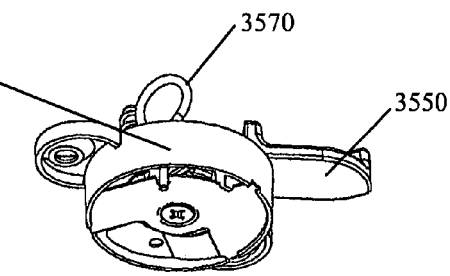
FIG. 62 is a bottom perspective view of the fastening device of FIG. 61.

FIGS. 47 & 48 illustrate the female component 3520 absent the bottom cover plate. As illustrated by FIGS. 48-47, the female component 3520 includes a housing 3540 and a locking mechanism 3530, similar to those described in the previous embodiments. As illustrated in FIGS. 47 & 48, the locking mechanism 3530 includes a hole 3552 for receiving a lock-out pin 3570 and a slot 3554 for receiving the releasing pin 3555 of the locking key 3550.

FIGS. 49-54 illustrate a top perspective, bottom perspective, top plan, side view, front view and opposing plan view of the housing 3540 of the female component 3520. When visible, FIGS. 49-54 illustrate an opening 3556 for receiving a lock-put pin 3570 and a slot 3558 for receiving the releasing pin 3555 of the locking key 3550.

FIGS. 55-60 illustrate a top perspective, bottom perspective, top plan, side view, front view and opposing plan view of the locking mechanism 3530 of the female component 3520. When visible, FIGS. 55-60 illustrate a hole 3552 for receiving a lock-put pin 3570 and a slot 3554 for receiving the releasing pin 3555 of the locking key 3550.

FIGS. 61-66 illustrate a top perspective, bottom perspective, top plan, front view, side view and opposing plan view, respectively of the fastening device 3500 having the male component 3510 engaged with the female component 3520 and further illustrating the locking key 3550 and the lock-out pin 3570 positioned in the female component 3520 of the fastening device 3500.

FIGS. 67-71 illustrate a perspective, front, bottom, side and top view, respectively of a locking key 3550 having a release pin 3555. FIG. 72 illustrates a perspective view of a lock-out pin 3570.

In all of the above embodiments, the position of the locking mechanism from the unlocked to locked position may vary depending upon the tolerance required to secure the two opposing structures. Thus, depending upon the tolerance, the position of the locking mechanism required to engage the male and female components in the locked position may vary.

From the foregoing, it may be seen that implementations of fastening devices and methods are provided that may provide one or more advantages over conventional devices and methods. For example, one or more of the foregoing implementations may significantly speed up and simplify the assembly of objects for the end user, particularly flat-packed structures such as furniture pieces. The fastening devices may be pre-installed at a factory or other source of the product and flat-packed for shipping. The fastening devices and the structures with which they are associated may be assembled by the end user without the need for tools, complexity, and an excessive expenditure of time. By providing the above-described self-tightening feature, an end user may simply bring mating parts together with little or no force being required, as the fastening devices draw and lock their associated structures together securely and, if desired, permanently. The fastening devices may be utilized to join component parts together in any desired orientation, such as end-to-end, face-to-end (i.e., 90 degrees), and the like. The fastening devices may be utilized to assemble any suitable product including, but not limited to, electronic devices, vehicular devices, and various types of furniture such as bookshelves, desks, cabinets, entertainment centers, chairs, tables, beds, partitions, cubicles, drawers, and dressers.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A female fastening device for receiving a male component for fastening two structures together, the female fastening device comprising:
a housing comprising an end face and a sidewall defining a cavity having a longitudinal axis, the sidewall having an interior surface and the end face having an inside surface and an inlet aperture for receiving the male component along an insertion axis substantially parallel to the longitudinal axis;
a retaining mechanism extending from the interior surface of the sidewall of the housing into the cavity of the housing and having a retaining surface for engagement with a movable member;
a movable member rotatably enclosed within the cavity of the housing and rotated about a rotation axis parallel to the longitudinal axis between an unlocked position and a locked position for retaining the male component within the cavity, the moveable member comprising an arcuate slot axially aligned with the inlet aperture for receiving the male component in the unlocked position and retaining the male component within the slot in the locked position, the movable member further comprising an axially projecting contact surface which releasably interlocks with the retaining surface to retain the moveable member in the unlocked position and wherein, upon insertion of the male component into the female device while the moveable member is in the unlocked position, the retaining surface is disengaged from the contact surface by axial movement of the retaining surface relative to the contact surface; and
an energy-storing mechanism enclosed within the cavity of the housing for rotatably biasing the movable member toward the locked position, wherein the retaining mechanism exerts compressive force on the energy-storing mechanism in the unlocked position such that the energy-storing mechanism is compressed to store energy to rotate the moveable member from the unlocked to the locked position, and wherein when the retaining surface is disengaged from the contact surface by axial movement of the retaining surface relative to the contact surface, the stored energy in the energy-storing mechanism is released, rotating the movable member from the unlocked to the locked position.

2. The fastening device of claim 1, wherein the inside surface of the housing has an axially projecting step defining the retaining mechanism.

3. The fastening device of claim 2, wherein the step is defined by the interface between a lower section and a raised section along the inside surface of the end face of the housing.

4. The fastening device of claim 1, wherein the energy storing mechanism is a biasing element comprising a section coiled around an axis substantially parallel with the path of insertion.

5. A device for fastening two structures together, the device comprising:

a male component having a head portion and a neck portion;

a female component for receiving the male component, the female component comprising:

a housing comprising an end face and a sidewall defining a cavity having a longitudinal axis, the sidewall having an interior surface and the end face having an inside surface and an inlet aperture for receiving the male component along an insertion axis substantially parallel to the longitudinal axis;

a retaining mechanism extending from the interior surface of the sidewall of the housing into the cavity of the housing and having a retaining surface for engagement with a movable member;

a movable member rotatably enclosed within the cavity of the housing and rotated about a rotation axis parallel to the longitudinal axis between an unlocked position and a locked position for retaining the male component within the cavity, the moveable member comprising an arcuate slot axially aligned with the inlet aperture and sized for receiving the head portion of the male component in the unlocked position and retaining the neck portion of the male component within the slot in the locked position, the movable member further comprising an axially projecting contact surface which releasably interlocks with the retaining surface to retain the moveable member in the unlocked position and wherein, upon insertion of the male component into the female device while the moveable member is in the unlocked position, the retaining surface is disengaged from the contact surface by axial movement of the retaining surface relative to the contact surface; and an energy-storing mechanism enclosed within the cavity of the housing for rotatably biasing the movable member toward the locked position, wherein the retaining mechanism exerts compressive force on the energy-storing mechanism in the unlocked position such that the energy-storing mechanism is compressed to store energy to rotate the moveable member from the unlocked to the locked position, and wherein when the retaining surface is disengaged from the contact surface by axial movement of the retaining surface relative to the contact surface, the stored energy in the energy-storing mechanism is released, rotating the movable member from the unlocked to the locked position.

6. A fastening device for fastening first and second structures together, the fastening device comprising:

a first structure having a side surface and a width end perpendicular to the side surface;

a second structure having a side surface and a width end perpendicular to the side surface;

a male component integrated in and perpendicular to the width end of the first structure;

a female component integrated with the second structure wherein the female component is positioned in the side surface of the second structure near the width end of the second structure for receiving the male component when the first and second structures are positioned perpendicular to one another, the female component being flush or countersunk with the side surface of the second structure; the female component comprising:

a housing comprising an end face and a sidewall defining a cavity having a longitudinal axis, the sidewall having an interior surface and the end face having an inside surface and an inlet aperture for receiving the male component along an insertion axis substantially parallel to the longitudinal axis;

a retaining mechanism extending from the interior surface of the sidewall of the housing into the cavity of the housing and having a retaining surface for engagement with a movable member;

a movable member rotatably enclosed within the cavity of the housing and rotated about a rotation axis parallel to the longitudinal axis between an unlocked position and a locked position for retaining the male component within the cavity, the moveable member comprising an arcuate slot axially aligned with the inlet aperture for receiving the male component in the unlocked position and retaining the male component within the slot in the locked position, the movable member further comprising an axially projecting contact surface which releasably interlocks with the retaining surface to retain the moveable member in the unlocked position and wherein, upon insertion of the male component into the female device while the moveable member is in the unlocked position, the retaining surface is disengaged from the contact surface by axial movement of the retaining surface relative to the contact surface; and an energy-storing mechanism enclosed within the cavity of the housing for rotatably biasing the movable member toward the locked position, wherein the retaining mechanism exerts compressive force on the energy-storing mechanism in the unlocked position such that the energy-storing mechanism is compressed to store energy to rotate the moveable member from the unlocked to the locked position, and wherein when the retaining surface is disengaged from the contact surface by axial movement of the retaining surface relative to the contact surface, the stored energy in the energy-storing mechanism is released, rotating the movable member from the unlocked to the locked position.

7. A fastening device for fastening first and second structures together, the fastening device comprising:

a first structure having a side surface and a width end perpendicular to the side surface;

a second structure having a side surface and a width end perpendicular to the side surface;

a male component integrated in and perpendicular to the width end of the first structure, wherein the male component has a head portion and a neck portion;

a female component integrated with the second structure wherein the female component is positioned in the side surface of the second structure near the width end of the second structure for receiving the male component when the first and second structures are positioned perpendicular to one another, the female component being flush or countersunk with the side surface of the second structure; the female component comprising:

a housing comprising an end face and a sidewall defining a cavity having a longitudinal axis, the sidewall having an interior surface and the end face having an inside surface and an inlet aperture for receiving the male component along an insertion axis substantially parallel to the longitudinal axis;

a retaining mechanism extending from the interior surface of the sidewall of the housing into the cavity of the housing and having a retaining surface for engagement with a movable member;

a movable member rotatably enclosed within the cavity of the housing and rotated about a rotation axis parallel to the longitudinal axis between an unlocked position and a locked position for retaining the male component within the cavity, the moveable member comprising an arcuate slot axially aligned with the inlet aperture and sized for receiving the head portion of the male component in the unlocked position and retaining the neck portion of the male component within the slot in the locked position, the movable member further comprising an axially projecting contact surface which releasably interlocks with the retaining surface to retain the moveable member in the unlocked position and wherein, upon insertion of the male component into the female device while the moveable member is in the unlocked position, the retaining surface is disengaged from the contact surface by axial movement of the retaining surface relative to the contact surface; and an energy-storing mechanism enclosed within the cavity of the housing for rotatably biasing the movable member toward the locked position, wherein the retaining mechanism exerts compressive force on the energy-storing mechanism in the unlocked position such that the energy-storing mechanism is compressed to store energy to rotate the moveable member from the unlocked to the locked position, and wherein when the retaining surface is disengaged from the contact surface by axial movement of the retaining surface relative to the contact surface, the stored energy in the energy-storing mechanism is released, rotating the movable member from the unlocked to the locked position.

8. A self-fastening structure comprising:

a first structure;

a second structure;

a male component integrated in the first structure;

a female component integrated in the second structure flush or countersunk with a side surface of the second structure; the female component comprising:

a housing comprising an end face and a sidewall defining a cavity having a longitudinal axis, the sidewall having an interior surface and the end face having an inside surface and an inlet aperture for receiving the male component along an insertion axis substantially parallel to the longitudinal axis;

a retaining mechanism extending from the interior surface of the sidewall of the housing into the cavity of the housing and having a retaining surface for engagement with a movable member;

a movable member rotatably enclosed within the cavity of the housing and rotated about a rotation axis parallel to the longitudinal axis between an unlocked position and a locked position for retaining the male component within the cavity, the moveable member comprising an arcuate slot axially aligned with the inlet aperture for receiving the male component in the unlocked position and retaining the male component within the slot in the locked position, the movable member further comprising an axially projecting contact surface which releasably interlocks with the retaining surface to retain the moveable member in the unlocked position and wherein, upon insertion of the male component into the female device while the moveable member is in the unlocked position, the retaining surface is disengaged from the contact surface by axial movement of the retaining surface relative to the contact surface; and an energy-storing mechanism enclosed within the cavity of the housing for rotatably biasing the movable member toward the locked position, wherein the retaining mechanism exerts compressive force on the energy-storing mechanism in the unlocked position such that the energy-storing mechanism is compressed to store energy to rotate the moveable member from the unlocked to the locked position, and wherein when the retaining surface is disengaged from the contact surface by axial movement of the retaining surface relative to the contact surface, the stored energy in the energy-storing mechanism is released, rotating the movable member from the unlocked to the locked position.

* * * * *